United States Patent
Younis

(10) Patent No.: US 10,310,069 B2
(45) Date of Patent: Jun. 4, 2019

(54) INDOOR POSITION LOCATION USING DELAYED SCANNED DIRECTIONAL REFLECTORS

(71) Applicant: Younis Technologies, Inc., San Diego, CA (US)

(72) Inventor: Saed G. Younis, San Diego, CA (US)

(73) Assignee: LONPROX CORPORATION, San Diego, CA (US)

( * ) Notice: Subject to any disclaimer, the term of this patent is extended or adjusted under 35 U.S.C. 154(b) by 279 days.

(21) Appl. No.: 15/200,785

(22) Filed: Jul. 1, 2016

(65) Prior Publication Data

US 2017/0131398 A1 May 11, 2017

Related U.S. Application Data

(63) Continuation of application No. 14/835,554, filed on Aug. 25, 2015, now Pat. No. 9,383,441.
(Continued)

(51) Int. Cl.
*G01S 13/42* (2006.01)
*G01S 13/87* (2006.01)
(Continued)

(52) U.S. Cl.
CPC .......... *G01S 13/876* (2013.01); *G01S 13/426* (2013.01); *G01S 13/753* (2013.01); *G01S 13/755* (2013.01);
(Continued)

(58) Field of Classification Search
CPC .... G01S 13/426; G01S 13/753; G01S 13/755; G01S 13/756; G01S 13/758; G01S 13/867; G01S 13/876; H01Q 15/14; H01Q 15/18
(Continued)

(56) References Cited

U.S. PATENT DOCUMENTS 3,480,951 A 11/1969 Freedman
5,579,008 A 11/1996 Hulderman et al.
(Continued)

FOREIGN PATENT DOCUMENTS

| DE | 43 06 660 A1 | 9/1994 |
| DE | 94 11 602 U1 | 8/1995 |
| WO | 1992/010765 A1 | 6/1992 |

OTHER PUBLICATIONS

International Search Report for PCT/US2015/046800 dated Nov. 26, 2015, 5 pages.
(Continued)

*Primary Examiner* — Timothy A Brainard
(74) *Attorney, Agent, or Firm* — Procopio, Cory, Hargreaves & Savitch LLP

(57) ABSTRACT

A mobile device determines its location accurately by measuring the range to a position reflector as well as azimuth and elevation angles of arrival (AOA) at the reflector. The mobile can transmit a coded radar signal and process reflections to determine its location. The reflectors may include internal delays that can identify the reflector and provide transmit/receive separation for the mobile. The reflection can include a primary and further delayed secondary reflection. The mobile can determine the internal delay of the reflector based on the delay between primary and secondary reflections. The range and AOA information can be combined with information about the position, orientation, and characteristics of the reflectors to determine location. In some systems, the mobile device can determine its location in a three-dimensional space using reflections from only one reflector. The reflectors, which can be economically produced, can be unpowered and low profile for easy installation.

17 Claims, 9 Drawing Sheets

Related U.S. Application Data

(60) Provisional application No. 62/041,569, filed on Aug. 25, 2014.

(51) Int. Cl.
*H01Q 15/14* (2006.01)
*G01S 13/75* (2006.01)
*G01S 13/86* (2006.01)
*H01Q 15/18* (2006.01)

(52) U.S. Cl.
CPC .......... *G01S 13/756* (2013.01); *G01S 13/758* (2013.01); *G01S 13/867* (2013.01); *H01Q 15/14* (2013.01); *H01Q 15/18* (2013.01)

(58) Field of Classification Search
USPC ............................................................ 342/5
See application file for complete search history.

(56) References Cited

U.S. PATENT DOCUMENTS

| | | |
|---|---|---|
| 6,630,905 B1 | 10/2003 | Newberg et al. |
| 2003/0008664 A1* | 1/2003 | Stein ..................... H04W 64/00 455/456.1 |
| 2004/0157621 A1 | 8/2004 | Yamasaki et al. |
| 2005/0105600 A1 | 5/2005 | Culum et al. |
| 2005/0270227 A1* | 12/2005 | Stephens ................... G01S 3/72 342/146 |
| 2006/0106850 A1* | 5/2006 | Morgan .................... G01S 5/02 |
| 2007/0178911 A1 | 8/2007 | Baumeister et al. |
| 2013/0265188 A1 | 10/2013 | Yamabayashi |

OTHER PUBLICATIONS

Extended European Search Report for related EP Patent Application No. 15836980.1, dated Aug. 17, 2018, in 17 pages.

\* cited by examiner

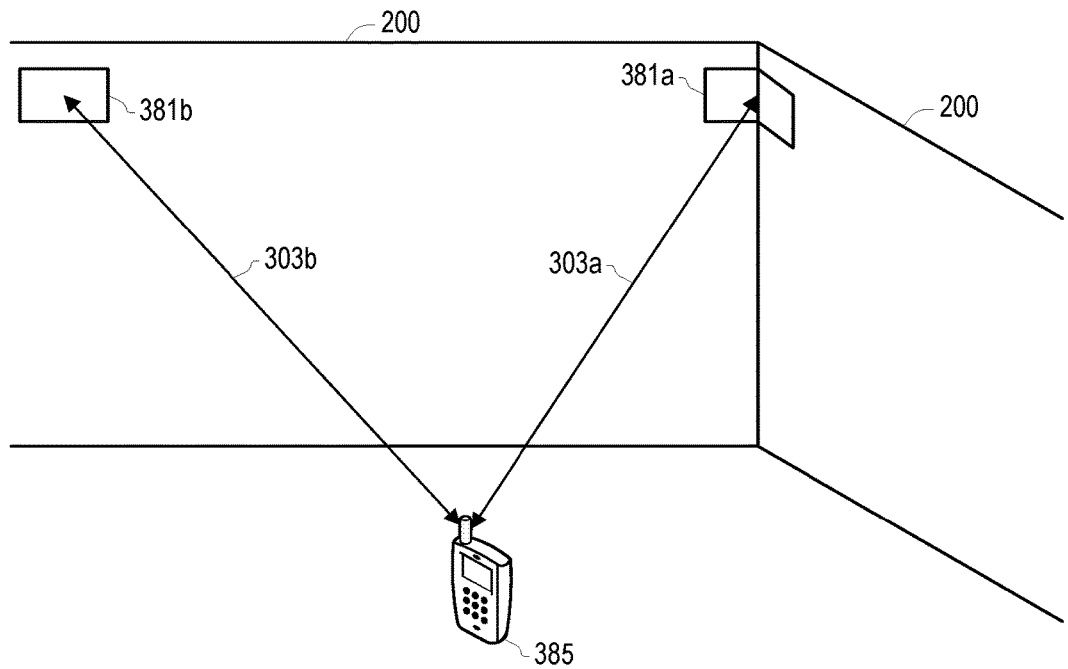
FIG. 3
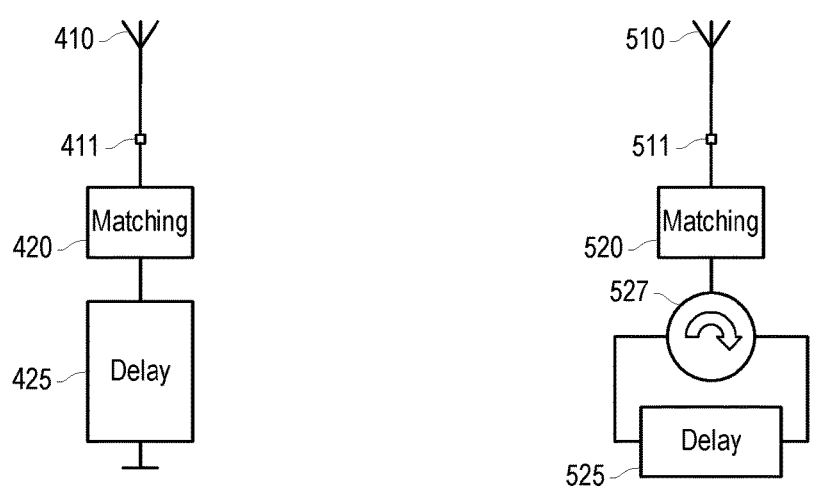
FIG. 4
FIG. 5

INDOOR POSITION LOCATION USING DELAYED SCANNED DIRECTIONAL REFLECTORS

CROSS-REFERENCE TO RELATED APPLICATIONS

This application is a continuation of U.S. application Ser. No. 14/835,554, filed Aug. 25, 2015, which claims the benefit of U.S. provisional application Ser. No. 62/041,569, filed Aug. 25, 2014, all which are hereby incorporated by reference.

BACKGROUND

The present invention relates generally to the field of positioning and, in particular, to systems and methods suitable for indoor location positioning.

Indoor position location is becoming increasingly important in today's mobile wireless devices environment. Whereas it took some time for outdoor location services to become widespread after the technology was available, today the applications for indoor position location is racing ahead of available technical solutions. Many technologies have been used for outdoor position location, chief among them are the Global Positioning System (GPS) using orbiting satellites that transmit timing and ranging signals that enable a receiver to calculate its position accurately. In addition to GPS a number of other technologies have been proposed with various degrees of adoption including cellular base-station triangulation and trilateration.

Unfortunately, technologies employed for outdoor position location perform poorly for indoor position location. This is because the signal of these systems is either missing or very weak indoors, as in the case with GPS, or the signal arrives with significant multipath to render it inaccurate for indoor positioning.

Some proposed systems attempt use available indoor Wi-Fi wireless signals to aid in determining the indoor position of a wireless portable device. Unfortunately, Wi-Fi radio-frequency (RF) environments can change unpredictably over time and even under ideal conditions the location may only be accurate to a resolution of a few meters. Other proposed systems employ wireless beacons that use the Bluetooth wireless protocol to narrow down the location of a wireless device. Such systems rely on detecting proximity to one of such beacons and therefore requires deploying a different beacon near every point of interest in the indoors environment. Only a few feet away from a beacon, the estimate of the position is no more accurate than one using Wi-Fi signals. These systems rely on detecting a certain router or a beacon with a certain preregistered code associated with a known and published physical location to establish approximate location and then use a Received Signal Strength Indicator (RSSI) to further narrow down the location. Such methods are limited in the ultimate resolution they can achieve in a large indoors area. Also while the first relies on already available low accuracy and often varying Wi-Fi signals, the beacon method requires blanketing an indoor area, such as a department store for example, with a large number of active beacons that need constant power source and physical management as the store changes promotions and refashions internal displays. In addition, those methods are either too inaccurate or too cumbersome to adopt in a domestic residential environment. Furthermore, since such methods rely on RSSI measurements, signal penetration through walls and floors results in a major drawback for both commercial as well as enhanced E911 services since with wall and floor penetration the location of an individual cannot be narrowed down to an exact room or an exact floor.

Other proposed systems for indoor position location are based on Ultra-Wide Band (UWB) methods, for example, as described in "Ultra-Wideband Positioning Systems" by Sahinoglu, Gezici and Guvenc, 2008. Unfortunately, such systems depend on a powered active radio-frequency identification (RFID) tag for proper operation and may include bulky batteries. With continuous tracking of numerous users within some vicinity, battery life becomes impractically short. In addition, the RFID tags may be costly.

Other proposed systems use coded LED lighting to determine indoor position location. Such methods rely on the camera of a mobile device detecting a coded lighting flicker from an LED light fixture to determine location. Unfortunately, there is a significant time where the mobile device of an individual is placed in a carrying bag or in a pocket. Also, in most cases, a costly replacement of numerous lighting fixtures is needed to accommodate the new LED bulbs. Furthermore, the accuracy of such technologies is only able to provide approximate location, such as location within a room, rather than determine actual location with sufficient resolution for commercial and residential applications demand accuracy on the order of few centimeters. Similar limitations occur when using infrared beacons.

Other proposed systems use ultrasonic sound waves. Such systems require retrofitting indoor spaces with multiple wireless/ultrasonic beacons and/or receivers needing their own power sources. In addition, ultra-sonic transmitting and receiving transducers may be too bulky and consume too much power for a mobile device or a battery operated beacon. In addition, ultrasound is severely muffled in a person's carrying bag or inside a pocket.

SUMMARY

In one aspect, a positioning system is provided that includes: one or more position reflectors, each of the position reflectors configured to reflect radar signals, each reflected radar signal including a primary reflection delayed by an internal delay of the position reflector; a server storing reflector data associated with the one or more position reflectors; and a mobile device configured to receive the reflector data from the server and to transmit a radar signal and process reflections of the transmitted radar to determine a location of the mobile device.

In another aspect, a method for location positioning of an electronic device is provided. The method includes: transmitting a direct sequence spread spectrum coded radar signal, the radar signal having a center frequency swept between two frequencies; receiving radar signals that include reflections from a plurality of position reflectors, each of the reflections including a primary reflection delayed by an internal delay of the corresponding position reflector and a secondary reflection further delayed by the internal delay of the corresponding position reflector; correlating information detected in the received radar signals with corresponding information used to form the transmitted radar signal to determine maxima in the reflections; detecting frequency information and delay information about the reflection using the determined maxima in the reflections; determining information about the internal delays of the position reflectors from the delay information; identifying the plurality of position reflectors using the determined internal delay information; determining a range to at least one of the plurality of position reflectors using the detected delay information and the determined internal delay information; determining an angle of arrival for the reflections from at least one of the plurality of position reflectors using the frequency information; and determining the position of the electronic device using the range and the angle of arrival.

In another aspect, a device for location positioning is provided that includes: a radio-frequency front end coupled one or more antennas; and a processor coupled to the radio-frequency front end and configured to supply a radar signal to the radio-frequency front end for transmission, receive, from the radio-frequency front end, signals reflected from one or more position reflectors, and process the received signals to determine a location of the device transmit, the processing including determining a delay from a primary reflection to a secondary reflection.

BRIEF DESCRIPTION OF THE DRAWINGS

The details of the present invention, both as to its structure and operation, may be gleaned in part by studying the accompanying drawings, in which like reference numerals refer to like parts, and in which:

FIG. 3 illustrates another example location positioning according to a presently disclosed embodiment;

FIG. 4 is a functional block diagram of a position reflector according to a presently disclosed embodiment;

FIG. 5 is a functional block diagram of another position reflector according to a presently disclosed embodiment;

DETAILED DESCRIPTION

Figure 1:
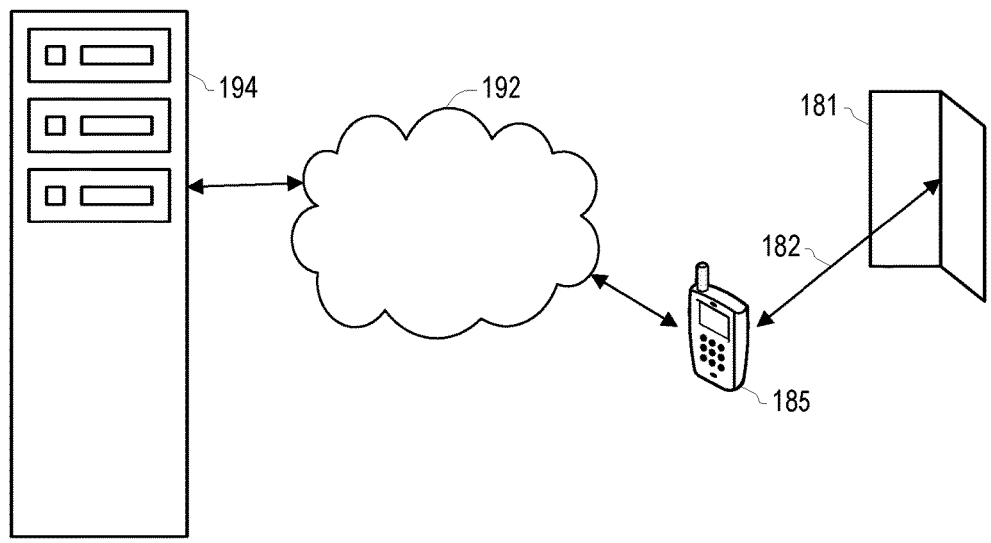
FIG. 1 is a functional block diagram of an indoor positioning system according to a presently disclosed embodiment.

Systems and methods through which portable wireless mobile devices can determine their indoor position accurately, e.g., to centimeter levels, using radar reflectors are disclosed. Frequency, and/or coded signal, scanned retro-directive or retro-reflective passive radar reflectors with built in fixed RF delays can be used. Such reflectors can be placed somewhere on the ceilings, walls, or floors of a given indoor space and their locations and orientations made available to the mobile device.

A mobile device can determine its location accurately by measuring the distance between it and a given nearby reflector as well as the azimuth and elevation angles of arrival (AOA) at the reflector using a specially coded radar waveform. By being able to determine its distance and angles relative to a given reflector of known location and orientation, the mobile device is able to determine its location in a three-dimensional space using only one passive reflector. Detecting reflections from multiple reflectors can increase the computed accuracy. Furthermore, carrier phase range determination techniques can be employed to yield improved accuracy under various indoor environments. Finally, given the reflectors' passive nature and low profile design, their installation is simple in both commercial and residential settings, for example, by affixing them to any flat and unobstructed surface within the indoor space or placing them on top of a ceiling tile with no wiring or surveying. Once installed, no maintenance is needed, such as battery replacement or recalibration. Furthermore, such reflectors contain very few passive components with lax tolerances, and therefore are very inexpensive to produce. These reflectors are also typically flat and unobtrusive and can be permanently installed on, behind or built into the drywall of a building for example.

Reflectors used with the presently disclosed methods and systems have various forms and functions. Some reflectors provide ranging information. Other reflectors provide angle information such as azimuth, elevation, or both. Reflectors may also provide both ranging and angle information. The reflectors may be referred to as radar reflectors, position reflectors, location reflectors, or similar terms. Additionally, reflectors may be referred to using adjectives that describe characteristics of particular reflectors, for example, composite reflector, delayed reflector, frequency scanned reflector, frequency scanned retro-directive reflector, unscanned retro-reflective radar reflectors, horizontal sweeping reflector, vertical sweeping reflector, linear reflector, passive reflector, or sectored reflector.

In an embodiment, a mobile device includes a circuit that transmits a radar signal to be reflected by a wall or ceiling mounted RF reflector. The reflector may include an internal delay. The reflector may be a frequency-scanned phased array type antenna structure. A frequency scanned phased array antenna structure is an antenna structure that has a high gain lobe in a given direction based on the frequency of excitation (see, e.g., "Antennas", second ed., John Kraus, 1988, section 11-11). As the frequency of excitation is changed, the directional angles of this main high gain lobe of the antenna also changes. Similar antenna structures have been used in radar installations where by sweeping the excitation frequency, the structure is made to sweep the direction of concentrated radiation angle out of the structure. Given the reciprocal nature of antenna structures, the direction along which the radiation is maximized for a given frequency is also the direction of maximum reception sensitivity at the same frequency. These types of antenna structures have only one connection port even though they are typically made out of a phased array antenna matrix. The phasing of the elements is achieved by inserting phasing delays in the RF power splitting/combining branching traces from the single port of the antenna structure to the radiating elements within the structure. Position reflectors can be installed in the ceiling corners of a room. In such cases, the required sweep angle can be less than 90 degrees. In one embodiment, these reflectors are made in such a way so as to have non-zero gain only in the direction of the room, without significant backwards sensitivity. This can reduce the possibility of reflecting or interacting with signals from adjacent rooms or floors.

In another embodiment, the reflector is designed to yield both azimuth and elevation AOAs. A single linear phased array can sweep an arc along one angle. To enable a reflector to yield two angles, a composite reflector may include two collocated reflectors, one sweeping vertically and the other horizontally. Each of the collocated reflectors responds to a different sub-band of excitation. The mobile transmits a frequency sweep for each sub-band and separately detects the azimuth and elevation AOAs. Some antennas can produce a raster scan as a function of excitation frequency and hence are able to yield azimuth and elevation angles with one frequency sweep.

In an embodiment, a mobile device transmits a radar signal with a continually sweeping center frequency. At some instant, the frequency of this radar signal equals the frequency that results in maximum antenna gain in the direction of the mobile device. At this point, the mobile detects maximum reflected signal power from the reflector back to the mobile. By noting this frequency and using the information that the mobile already has from the network about the position, orientation and angle of radiation as a function of frequency for this antenna reflector, the mobile is able to compute the angle relative to the antenna structure along which the mobile resides. In addition, by measuring the round trip delay between the transmission of the signal and subsequent detection of the reflection, the mobile can also compute the distance between the mobile location and the reflector. Having knowledge about the location and orientation of the reflector and having detected the distance and AOA to this reflector, the mobile is able to calculate its position in 3D space. In order to achieve very high accuracy, carrier phase ranging techniques can be used.

In one embodiment, the mobile transmits a radar signal that sweeps a certain width of frequency looking for the highest reflected power. The frequency with the highest reflected power is the frequency resulting in maximum reflection in the direction of the mobile. At this point, the mobile may limit the frequency sweep to frequencies close to this center frequency for subsequent position fixes since the mobile may not have moved much. This reduces the search time and reduces transmitted power. Using power control in the mobile, that is by reducing or increasing the radiated power for a given radar signal to transmit a signal that results in reflections with minimum detectable reflected power, the mobile can increase battery life and reduce interference to other close by devices. In addition, two mobiles that are separated by a given angle related to the reflector would be using different frequencies for their radar signals since their AOA to the antenna is different. This increases the capacity of the system since one reflector can handle multiple mobile devices within a given area simultaneously and with minimum cross interference because of differing frequencies and antenna gain sectorization based on the reflector antenna retro-directive radiation concentration towards the direction of the exciter. In the case of mobiles that are very closely collocated, time division, frequency division or code division multiple access techniques could be used so that each device could distinguish its own signals from that of others.

In one embodiment, the signal received at the reflector antenna is delayed before being reradiated back to the mobile. The delay is typically on the order of a few fractions of a microsecond to several microseconds but could be larger or smaller. This could be achieved by a number of passive RF components such as, bulk acoustic wave (BAW) devices, loaded delay lines, LC delay lines, surface acoustic wave (SAW) devices or other RF-Acoustic methods (e.g., similar to those previously used by portable video cameras to support the PAL TV standard). In addition, a signal could be delayed by using newly developed meta-material structures with negative permittivity and/or permeability where group delays could be made arbitrarily long.

In the case of an embodiment using a BAW filter, the input of the antenna feed line is matched and connected to one side of the BAW filter while the other side of the filter is shorted to ground. The BAW filter may be selected to pass all of the energy in the radar transmitted signal. A signal received at the antenna has an unavoidable immediate reflection due to unavoidable mismatches. Then the bulk of the signal is fed into the BAW filter. After one propagation delay time through the BAW filter the signal is fully reflected by the short to ground. The signal experiences another propagation delay time before driving the antenna structure and reradiating back in the direction of the mobile device. In this embodiment, the mobile knows a priori this delay of a given reflector and subtracts it from the round trip delay calculation in order to calculate the true physical distance between a mobile and this reflector.

By delaying the radar pulse before reflecting it back to the transmitting mobile a number of advantages are achieved. Firstly, a transmitted radar signal from a mobile may have about a 90 ns delay spread for a typical room to 200 ns delay spread for a shopping center. This is the time during which the signal continues to persist with detectable power due to parasitic reflections from environmental obstacles (see, e.g., "OFDM For Wireless Multimedia Communications", R. Van Nee and R. Prasad, 2000, sec. 1.3). By delaying the received signal at each reflector by a time longer than this time, false location determinations due to parasitic environmental reflections, such as from mirrors or electrically large metal objects, are eliminated since a signal received after a delay longer than the minimum reflector delay can only come from a reflector. It is possible though, to still get a reflected signal from a reflector that also reflects off of a conducting object along its way to a mobile. This multipath parasitic signal has a much lower probability of occurrence than direct parasitic reflections due to the delay in the reflectors and its effects can be further reduced by making sure that the reflector is placed in a location that maximizes the probability of line of sight reflections. Also, in most cases, large parasitic reflectors are located on or near walls. Because the mobile also knows the angle of incidence at the reflector, and because such reflectors are close to room surfaces, an erroneous computed position typically leads to illogical physical locations due to room extents and can be dealt with accordingly.

In addition, an internal delay inserted in the reflector allows the mobile to transmit a radar wave that is much longer, when mapped in physical space using the speed of light, than the typical maximum indoor distance between a mobile device and a reflector while at the same time still allowing for the transmitted and reflected signals not to overlap at the mobile. A longer radar signal results in higher distance resolution and better lower peak to average ratio for the transmitter. The non-overlap also means that the mobile can allocate alternate non-overlapping times for either signal transmission or reflection reception modes. By scheduling the transmit and receive modes of operation at alternate non overlapping times, the receiver front-end circuit is greatly simplified since TX signal leakage back to the RX side are avoided due to TX and RX not occurring simultaneously.

In addition, the radar signal may be encoded using direct sequence spread spectrum (DS SS) phase modulation. In these systems, the internal reflector delay facilitates distinguishing between a transmitted signal and its reflection if the built in reflector delay ensures a more than one chip delay separation.

The delay of the signal within a given reflector can be known and tightly controlled on a continuous basis. This is because this delay directly adds to the round trip delay and any discrepancies between its previously published delay and the actual delay, due to temperature drift or component aging, results in direct error in computing the distance between a mobile device and a reflector. While it is possible to continuously measure and republish the actual delays in a timely fashion by a periodic calibration process, an alternate embodiment disclosed herein addresses this in an alternate fashion.

In one embodiment, the reflector uses a BAW filter to delay the received radar signal. Instead of reflecting all the power, the reflector internally uses a directional coupler that matches the impedance of the antenna structure to the BAW device for a received signal. The signal within the BAW having been reflected by the short to ground on the other side of the BAW is reflected towards the input port of the BAW. In this direction, an intentional mismatch exists that allows a portion of the original signal to couple back to the antenna structure and get radiated back to the mobile while the remaining portion is reflected back into the BAW. A portion of this redirected remaining portion is allowed to couple to the antenna after another round trip delay within the BAW and the cycle repeats. For example in one embodiment, the mismatch would allow 4/5, or −1 dB, of the original signal to couple to the antenna and cycle back one-fifth. On the second reflection, the antenna would reradiate 4/5×1/5=4/25 or about −8 dB of the original signal. Next reflection would be 4/5*1/5*1/5=4/125 and so on. The important fact here is that the mobile shall receive a portion of the signal after 2 times the BAW delays plus free air round trip delay. It shall receive another signal later on at precisely 4 times the BAW delay plus the same free air round trip delay. Given these two readings, the mobile can accurately measure the BAW round trip delay, subtract it from the measurement of the first reflection round trip delay and hence can accurately determine the distance from the mobile to the reflector. Since this is done on the fly, no calibration, matching or measurements needs to be repeated after the installation of the reflectors since the mobile is able to adjust for the possible small delay drifts due to temperature and component aging. Manufacturing tolerances imposed on BAW group delays could be relaxed significantly and the published reflector delay need only be approximate. A design tradeoff involves choosing what fraction to couple back to the antenna and what portion to reflect back to the BAW. Having a large portion couple to the antenna increases the SNR of the first reflection but subsequent reflections could be too weak to detect. In contrast coupling large portion back to the BAW weakens the first reflection and the structure continues to re-radiate residual energy for a long time. For example if 1/4 is chosen, the first reflection from the antenna would be −1.25 dB down from the original received power. The second reflection would be about −7 dB down from original received power and the third is −13.25 dB and so on. Alternatively if 1/10 is used, the reflected signal powers would be −1 dB, −10.45 dB and −19.9 dB respectively. Please note that the mobile needs to process the second reflection only once, after that the mobile need only process the first reflection since the delay in the BAW is not expected to change appreciably in a short period of time. Furthermore a mobile device having performed this reflector delay determination with a strong degree of confidence uploads this measurement value along with a degree of confidence indicator to the public server to be used by other mobiles. Depending on the degree of calibration confidence, other mobiles may elect to use this recently published value rather than repeat the measurement themselves. Please note that we have ignored delay element insertion loss for clarity. In practice, the reflected signals would incur two insertion losses of the delay element for each round trip propagation within the delay element. We also have assumed that a BAW filter is used for the delay as an example. Other delay elements may also be used.

So far we have described how a mobile can determine its distance from a given reflector in addition to the AOA at that reflector. In order for the mobile to correctly determine its position, it should determine which reflector a given signal reflection is coming from, in case there are more than one reflector in the vicinity. It also should know the position and orientation of that reflector along with the frequency vs. AOA arrival characteristics for each reflector and the fractional reflected power ratio for the first reflection of a reflector. The frequency vs. AOA arrival characteristics, the approximate embedded delay and the fractional reflected power fraction for the first reflection, could be determined either by design or by measurement during the manufacturing process of such reflector and a unique reflector type number could be associated with each distinct characteristics associated with a given reflector variant. During installation, a lookup table is populated that contains a reflector ID number, a frequency characteristics number and entries for physical location and orientation of each installed reflector. In addition, an entry is also included in the table that gives the approximate built in delay, if any, each reflector employs. This information is made to reside on some server in the internet cloud, whether local or global, and made accessible to all devices that are allowed to perform a position location fix within some vicinity. The reflectors' location and orientations could be given relative to an indoor landmark or given relative to a standard geographic surveying and positioning datum. While an accurate tabulation of the reflector delays is not strictly needed since the mobile can determine it from the fractional reflection method described above, it can nevertheless be provided to reduce the time during which a mobile is listening to a possible reflection.

A mobile can also determine which reflector a given reflection could be coming from. Various techniques can be used for reflector identification. One embodiment is based on characteristics (e.g., delay and/or filtering) that a given delay element, such as a bulk acoustic wave device (BAW), within a reflector exhibits. These built in reflector delays are much larger than the longest free air round trip delay and hence can be easily distinguishable by having each reflector within a close proximity exhibit a different built in delay from those of its neighbors. Also, these delay elements can have differing frequency filtering characteristics thereby aiding in correct reflector-reflection assignments.

Another embodiment uses a known previous or approximate location of the mobile to rule out erroneous mappings of reflection to reflectors. For example, in spaces where there are few reflectors that are sparsely located, it is possible on some occasions for a mobile to receive a reflection from only one reflector. Using such a reflection, the mobile is able to determine the distance from and AOA at a reflector. Using this information, the mobile calculates a possible mobile location based on this distant and AOA for each reflector in the extended vicinity, including reflectors residing in above and below floors and within adjacent rooms. Having an approximate idea about its position from a previous and recent position fix or by using any of the other inaccurate methods currently employed for indoor positioning, the mobile can with high probability quickly rule out all of the erroneous positions and hence can pick the right position and determine the correct reflector it is detected using at that instant. A refinement of this embodiment involves throwing away the erroneous positions based on physically impossible location such as being inside a wall or below a floor or outside a window just to name a few examples. It should be noted that in addition to the calculated distance, the fact that embodiments of the systems described herein also determine AOA at the reflector greatly improves the odds of detecting false locations and identifying the correct location associated with the correctly identified reflector. This information can be used for subsequent fixes as aiding information. Kalman filtering techniques could be used to further make the determined position more robust to noisy measurement.

Another embodiment to determine which reflector a reflection is coming from involves using the radar signal reflected power. Given the retro-directive nature of the reflectors, the method of fractional power reflection outlined above for embedded delay quantifying, and the fact that conditions of line of sight are expected to be prevalent for accurate positions, it becomes possible to calculate with some accuracy the expected power level that would have returned from each given reflector had the reflection come from that given reflector. This gives an additional indication if the reflection is line-of-sight or is coming through walls, ceilings or floors. It could also indicate if the reflection is bouncing off of another object in between the reflector and the mobile device as well. All of this information aids in correctly assigning a detected reflection to the respective reflector correctly determine the mobile position. It also determines the degree of confidence the last location has been calculated with. Furthermore we can attempt to distinguish reflectors in the same vicinity by having each reflector differ from others by the fractional reflection coefficient of each reflector which was used to allow for accurate measurement of the built in reflector delay. By measuring the power difference between subsequent reflections, we can determine an estimate of this coefficient for each reflected signal and we then can associate it with a specific reflector using the information in the public table.

In an alternate embodiment, we can design the reflectors in the vicinity to have differing frequency vs. main lobe sweep angle characteristics. For example, in an embodiment, one reflector could have a 5° of main lobe sweep per one MHz of frequency sweep while another can have 7° of sweep per MHz of frequency sweep. Once a mobile has detected a maximum reflection frequency for a given reflection, it then sweeps this frequency and monitors how fast the reflected power drops off. Because the mobile already knows the distance to the reflector for a given reflection, the mobile can predict how fast the reflected power should drop off as the excitation frequency moves off of the optimal frequency. By comparing this result for each of the reflections, and knowing the sweep characteristics for reflectors in the vicinity from the published installation data, the mobile is able to correctly assign each reflected signal to the correct corresponding reflector and hence the mobile device physical location can accurately be determined. This idea of reflectors having differing frequency sweep characteristics could be expanded to other frequency characteristics such as having each reflector respond to different frequency sub-bands within a given band. In one embodiment, the first reflector does a full sweep of the direction of the main lobe across the whole space using a frequency span of $f_0$ to $f_1$. Another reflector uses $f_1$ to $f_2$ to do the same. This allows unambiguous determination of which reflection belongs to which reflector.

All of the above embodiments that sought to determine from which reflector in the publicly published reflector table a given reflection is coming from have assumed that the mobile receives reflections from one and only one reflector. If however the mobile is able to receive reflections from two or more reflectors, determining which reflection came from which reflector becomes simpler. In most cases if we were to erroneously swap the allocation of the reflections to the reflectors, the new computed position would necessitate very different maximum reflection frequencies for the AOAs at the reflectors for convergence than what was measured thus detecting the error. We then choose the correct position with the correct reflector-reflection assignment. In some cases, specifically where the mobile is equidistant from the reflectors and at the same time far away from them, it becomes more challenging to guess at the correct reflection-reflector assignment. Fortunately, under such assignment, both of the computed positions, the ones with correct and incorrect reflector-reflection assignment, are close to each other and the position error due to the possible erroneous assignment is small. Nonetheless, it is expected that under such situation, and being far from two reflectors, that another reflector would be nearby and would give a more accurate position and resolves the error. We can reduce such occurrences of bad geometry by paying attention to reflector positioning. Also, we can mix horizontal sweeping reflectors with vertical sweeping reflectors to further reduce bad geometry occurrences.

In an embodiment, the system uses some or all of the techniques and methods outline above to correctly assign reflection to their respective reflectors thus resulting in correct computation of the mobile's position.

Systems disclosed herein can operate at a number of RF bands including the available licensed or unlicensed bands. The higher the frequency, the smaller the antenna structure needs to be physically to achieve the same directivity and antenna structure gain response. Also higher bands provide higher spatial resolution of position. On the other hand, higher frequencies result in more expensive Tx and Rx electronics and higher power consumption in the mobile device. Higher frequencies when coupled with carrier phase ranging techniques leads to very accurate position determination limited only by available Signal-to-Noise ratio and by the used bandwidth as discussed below.

The structure of the radar signal that can be used by the mobile along with the aforementioned reflectors in order to arrive at a good estimate of the mobile distance to a reflector with dynamically varying degrees accuracies as needed by the applications requirement at a given instant is now described. The theoretical limit on accuracy within the ranging application is given by the Cramer-Rao lower bound (CRLB) (see, e.g., "Fundamentals of Radar Signal Processing" by Mark A. Richards, 2014 and "RF Ranging for Location Awareness", UC Berkeley technical report, by Lanzisera and Pister, 2009).

For ranging applications the CRLB is given by the formula $$\sigma_r^2 \geq \frac{c^2}{(2\pi B)^2 E_S/N_0}\left(1 + \frac{1}{E_S/N_0}\right) \quad (1)$$

where $\sigma_r$ is the range measurement variance, c is the speed of light, B is the signal bandwidth and $E_S/N_0$ is a measure of Signal-to-Noise (SNR) ratio at the receiver. Equation (1) simplifies to $$\sigma_r^2 \geq \frac{c^2}{(2\pi B)^2 E_S/N_0} \quad (2)$$

for typical Signal-to-Noise ratios expected to be used in indoor ranging.

We can see from the formula that we are able to reduce $\sigma$ and hence increase range accuracy and resolution, by either increasing the signal bandwidth (BW) or by increasing the signal SNR for our signal or both. For RF signals, increasing bandwidth can be done in a number of ways. All of them require that the RF signal be modulated in a number of different ways. Early continuous wave radars (CW) used single frequency tone for the radar signal. Typically that tone was switched on and off to increase maximum range. In addition, the time when the wave was on was made as short as possible to increase BW and hence increase range resolution. This inefficient way of increasing BW results in very high peak-to-average ratios in the transmitting power amplifier and also does not easily allow for multiple users within the same vicinity.

In one embodiment, the mobile uses the method of Frequency Modulation, both linear and non-linear sweeps, with or without pulse windowing, to increase the signal BW. Given the same SNR, frequency modulation can increase range resolution by 1/BW in time and 2c/BW in distance. Linear frequency modulation (LFM) is a technology used in some radar systems. For the reflectors disclosed herein, note that changing the frequency changes the angle of directivity at the reflectors. For this reason, the extent of frequency sweep (BW) is limited in this embodiment to BW during which the reflector's directivity changes little. Hence in this embodiment, changing the center frequency of the signal results in different reflector directivity angles. But changing the frequency around the center frequency by a smaller BW such as in the case of LFM results in minor directivity changes to insure that retro-directivity is preserved during LFM sweeps. LFM frequency modulation is used in an embodiment. But many other frequency modulations instead of LFM can also be used including non-linear frequency modulation, windowed frequency modulation, gated LFM, up sweep and down sweep LFM, as well as stepped chirp waveform (see, e.g., "Fundamentals of Radar Signal Processing").

In one embodiment, co-located mobile devices using frequency modulation can choose different sweep rates, differing gating ON/OFF times, and different center frequencies as dictated by the reflectors to distinguish their radar signals from other mobile devices nearby.

In an embodiment, a phase modulated signal is used. Example phase modulation includes BPSK or QPSK types. The carrier is modulated using direct sequence spread spectrum (DSSS) to increase the signal bandwidth (BW). DSSS serves two purposes in this embodiment. It increases the BW and hence improves range measurement accuracy according to the CRLB. It also provides multiple-access capability. Multiple-access refers to the ability to support numerous mobile devices within the same vicinity such as the case in shopping centers and sports events. This multiple access could be achieved by using different pseudo random number sequences (PRN) as is currently employed in GPS to distinguish among different satellite signals or by using the same PRN but separating users by PRN offsets larger than any expected reflection delay, as is used today in CDMA communications systems to separate different mobiles and cell sites on the same frequency (see, e.g., "CDMA RF Systems Engineering", Samuel C. Yang, 1998).

In one embodiment, instead of using pseudorandom number (PRN) sequences, a mobile uses truly random number (TRN) sequences. PRN sequences are called pseudorandom because they are actually not random but are generated according to a mathematical relation designed to produce a sequence that mimics as much as possible a true random sequence.

Being truly random, TRNs by definition have infinite cycle length. They can be generated on the fly within a mobile by digitizing a naturally occurring random phenomenon, such as amplified thermal noise, or diode reverse biased avalanche noise. Such TRNs have theoretically zero cross correlation with other TRNs and hence signals coded using them really looks like higher thermal noise to all other listeners or to any copy of itself shifted in time by one or more chip period. Using TRNs is possible since both the Tx processing and Rx processing is performed in the same device given the passive and linear nature of the reflectors. With Tx and Rx happening on the same device, TRN usage is done by keeping a temporary copy of the true random sequence values used to generate the TX signal until these are value are used for correlating, or de-spreading, the reflections at Rx. All other previously proposed indoor solutions where the sender of the ranging signal is physically separate from the receiver, would not be able to use a TRN in real time. This removes any limit on integration time and allows the mobile to choose whatever integration time it needs to attain the accuracy it desires at a given instant.

Even though the mobile clock need not be synchronized to absolute time with external sources for effective signal correlation because both Rx and Tx reside on the same mobile and use the same local oscillator, the mobile clock however should be accurate enough to time the reflections time of flight at the speed of light to yield the desired range accuracy. In other words, while it is not important for the mobile clock to keep absolute global time, the local mobile clock should measure the time from Tx to Rx reflection accurately. Insuring that a clock keeps accurate differential time, Rx_time−Tx_Time, is a much simpler problem than to insure that the local mobile clock accurately keeps absolute time. In an embodiment, the mobile is made to keep accurate differential time by locking the local oscillator to any present RF signal available in the environment known to be derived from accurate reference and that this source is not moving so as not shift its apparent frequency due to Doppler. For indoor environments the user movement is slow enough to make neglecting Doppler due to user movement acceptable except for the most stringent applications. Examples of external stationary reference sources with very accurate frequency references include broadcast radio or TV signals or any cellular network, including asynchronous networks. In fact all modern cellular mobile phones, such as CDMA and LTE, already do that to enable proper communications between the mobile and a cell site. This locking of the local oscillator to a cellular network signal have also been used to allow for longer GPS signal correlation times in some outdoor position location implementations. Once the local oscillator is locked to a cell site pilot signal for example, the local oscillator period is adjusted to be equal to that of the GPS constellation detected at the cell site. In effect this operation allows a relatively inexpensive local oscillator to maintain "stop watch" accuracy as accurate as GPS time, thus achieving very high accuracy range measurement. Please note that even after oscillator lock, the mobile device's absolute time may differ from absolute time by an unknown mobile to cell site propagation delay. Fortunately, absolute time according to an external datum is not needed due to the passive nature of the reflectors. This technique works indoors because of the ubiquitous cellular coverage in today's indoor environment. Locking the oscillator to an external reference may be performed when very high positional accuracy is desired. In other applications, a crystal-based local reference oscillator has sufficient accuracy.

It is important to note here that in an embodiment the built-in delay within a given reflector when phase modulation is used has to be larger than a single PRN or TRN chip period. This is because it is expected in indoor environments that a distance travelled during a single chip period at a typical chipping rate is much longer than the measured ranges encountered. For example at a 10 MHz chipping rate, the chip length in distance is about 30 meters in free air. That means that it is highly likely that a signal would exit the mobile TX, travel to a reflector and back to the mobile Rx all within a single code chip. This means that the mobile needs the reflectors built in delay to be greater than one chip to distinguish between a Tx signal and its echo Rx signal from the same mobile. Furthermore, every reflector should have a delay different from every other reflector by a minimum of one code chip period, 100 ns for 10 MHz chipping rate for example, in order to separate reflections from various reflectors in the vicinity. This can easily be accomplished with simple BAW filters in one embodiment. Also, in implementations where the reflectors employ partial reflections, reflector delays should differ from one another by more than one period to allow the multiple fractional power reflections to die down from a given reflector to prevent secondary reflections from a near reflector matching the PRN delay of a far reflector with longer built in delay.

Systems disclosed herein can be insensitive to the near/far problem experienced by pseudolites and beacons for indoor position location. This is because most of the time reflection from different reflectors occur at different center frequency due to the reflector frequency angle sweeping feature and hence can be isolated based on frequency bases. In addition the ability to use long PRNs as well as the theoretically infinite cycle TRNs allows for better separation of near/far own reflection signals due to low cross correlation values for such codes. Long PRNs or TRNs are made feasible by the fact that the same local oscillator is used for both spreading and dispreading the signal up to the limit of the oscillator phase noise. Furthermore, under very congested conditions, a central network radio link manager can arbitrate among mobiles to insure that intolerable cross interference does not occur. This manager could reside somewhere in the internet cloud. This is possible because the reflectors are passive, as opposed to radiating beacons or pseudolites, and hence only radiate signals that come from mobiles in the vicinity. The radio link manager can allow only a manageable number of mobiles simultaneous-access to use the reflectors in the vicinity to insure useful position location determination for all at the desired or achievable level of accuracy. System can be very insensitive to the near/far problem of other systems because the mobile is able to determine its location using one near reflector. Detected additional far reflectors improves accuracy but is not needed for useful 3D position determination. Therefore, in the unlikely event that a mobile receives reflections from two reflectors at the same center frequency with one reflection having much higher power than the other, the mobile possibly seeing one reflector still can usefully calculate its position and in a short time, a little movement changes the antenna sweep center frequency allowing the mobile to detect the other reflector and hence to refine the previous position determination.

In an embodiment, the mobile receiving a very strong reflection for a near reflector that masks other reflectors can reduce the reflected power from this near reflector by detuning the transmitted frequency from the optimal that results in maximum reflection in the direction of the mobile. This can seriously degrade the reflected power from the near reflector allowing the mobile to detect signals from far reflectors with much lower reflected power. The mobile can also perform separate power control on each center frequency exciting a different reflector to reduce the needed Rx dynamic range due to near/far phenomenon.

At locations that are expected to have single users or low number of sparse location determining users, such as within private residences, the primary purpose for phase modulation of the radar signal is solely to increase the signal bandwidth BW so as to result in finer range resolution between a mobile and a reflector. Under such scenarios, and in one embodiment, the mobile can employ relatively short PRN codes such as baker codes or products of shifted baker codes or any number of other codes (see, e.g., section 4.10 in "Fundamentals of Radar Signal Processing"). Here the desired BW increase is a consequence of the chip rate and not the PRN sequence length. Hence, even though these sequences are short, one can still attain the BW increase, and hence range resolution improvements, by a chipping rate of approximately 1/BW. Given the low number of users, SNR improvement to increase accuracy can be done by increasing output power since the probability of adjacent users is low. Still, even for these sparse environments, longer codes can still be used to improve SNR.

In an embodiment, at locations where one expects numerous mobile devices to be attempting to determine their location within close proximity of each other, a longer PRN sequences or even TRN sequences are used. With longer sequences two system architectures present themselves. The first architecture does not allow for simultaneous TX and RX to occur within the same mobile (Half Duplex). The second does allow for simultaneous TX and Rx at the same time (Full Duplex). In radar systems Half Duplex have been traditionally favored. This is because in radar systems the received signal is a delayed copy of the transmitted signal. Hence typical channel separation between Tx and Rx using simple band separation may not be practical. So for the majority of radar systems to date, the Tx and Rx activities are time interleaved to that the Rx does not get overwhelmed by the Tx signal leaking back into the Rx path.

In one embodiment, a mobile device uses long PRN or TRN sequences in modulating the phase of the transmitted radar signal and time interleaves the Tx and Rx activities. To get the full benefit of a PRN sequence, one should send at least one full PRN sequence length. During which time the Rx side is masked off. In order for the Tx and Rx not to overlap, either of two alternatives are employed. The first is that the built in delays employed in the reflectors are made long enough to accommodate one full length of a PRN sequence. In other words, no reflection is sent back while a full length of the PRN is transmitted, after which Tx is turned off and Rx is enabled just before receiving the reflections. Another alternative is to time interleave Tx and Rx activities within a single PRN sequence length. For example, Tx is turned on and transmits a portion of the PRN sequence length then turns off Tx enabling Rx to listen to echoes of reflections. After a period of expected reflections, Tx is turned on to transmit another portion of the PRN sequence while the Rx is disabled and so one. This interleaving continues until the PRN total sequence length is transmitted. This interleaving has the result of keeping the built in reflector delay from being large but at the same time preserves the advantages of long PRN sequences. In both alternatives the period between sending the first chip and receiving the last chip in the sequence is theoretically the same. However in the case of the portion interleaving, some guard time between Tx and Rx switching should be accounted for in addition to the variable delays of the reflectors.

In another embodiment, both Tx and Rx occur simultaneously (Full Duplex). In radar systems, the Tx signal splashing the Rx path is known with great accuracy since it is constructed within the same mobile. Under such scenarios, active noise cancellation techniques can be used on the Rx signal path to subtract out the coupled and undesirable Tx splashing. Circulators, cross antenna polarization and active noise cancellation may, for example, be used. This gives sufficient dynamic range to useful indoor position location. The fact that all reflectors have a minimum of one code chip delay means that close reflections from the environment could be attenuated by the dispreading Rx operation. Also, the use of long PRN or TRN codes allows for higher processing gains to ameliorate this isolation requirement and is further made possible by the negligible cross correlation due to negligible relative Doppler shift due to the slow relative motion between the mobile and the reflectors. Please note that due to the retro-directive property of the reflectors, the radar reflection is much stronger than in typical radar applications and hence lower dynamic range is required leading to less required Tx/Rx isolation.

In addition to the various embodiments of modulating the signal both to increase BW and/or allow various multiple-access operation, we can also improve range resolution by increasing the SNR ratio as stated in the CRLB equation. Increasing SNR is done in two ways. In one embodiment the SNR is increased by increasing the average transmitted power for the radar signal from the mobile. This can be done until the FCC limit for maximum radiated power from a mobile device is reached for a given band or when the battery power consumption becomes prohibitive. In another embodiment, the Rx correlation time is increased thus increasing the processing gain of the Rx and improving the equivalent SNR. Increased correlation time requires tight synchronization between Tx and Rx master clock for frequency and period accuracy. Fortunately, systems disclosed herein use passive reflectors and hence both the Tx and Rx signals use the same clock within the same mobile. Under such circumstances, the correlation time is only limited by how much the local clock drifts during the time it takes for a reflection round trip delay, including the reflector built-in delay, typically in the order of microseconds, and hence the correlation time could be infinite even for inexpensive oscillators. The longer the coherent correlation time, the higher the processing gain and hence the higher the achieved SNR. An example of this is what happens in GPS where the received signals are typically −25 dB relative to thermal noise floor yet the receiver is able to detect and process the signal due to processing gain using long correlation times.

In GPS, the emitted DSSS phase modulated carrier is not filtered and hence the spectrum approximates a SINC function that extends infinitely to the left and to the right of the carrier frequency. GPS is able to do this since the received signal power at sea level is about 25 dB below natural thermal noise level. For terrestrial communications, the power level is higher and the out of band emissions should be filtered. Therefore a typical terrestrial DSSS transmission has a flat spectrum power level within the transmitted BW and very low emissions outside of that BW. Given the frequency sweeping nature of the reflectors we would expect that the reflected signal has a spectrum that is not flat within the transmitted BW. This is because the gain of a reflector drops as the frequency gets away from the frequency that gives the maximum reflection in the direction of the mobile. If we assume that the mobile is transmitting the DSSS where the center frequency of the transmitted signal is exactly the frequency needed for maximum reflection in the direction of the mobile, then one would expect that the spectrum of the reflected signal would not be flat but would fall off in power equally as we get away from the center to either side. If the transmitted signal had a center frequency that was slightly higher or lower than the frequency needed for optimal reflection in the direction of the mobile then that peak power would be offset from the center of BW to one side or the other. This provides an indication to the mobile that it should adjust its center frequency, and in which direction, in order to track the frequency that is needed for maximum reflection for a given reflector in the direction of the mobile and hence a symmetric reflected spectral power around the adjusted center frequency. Which also provide an indication for the AOA without needing to continuously sweep the frequency.

In one embodiment, the mobile is flexible enough to increase or decrease the effort it utilizes to achieve various levels of accuracy. As we have stated previously, increased accuracy demands increasing either or all of signal BW, transmitted power level and coherent Rx correlation time. Increased BW results in some of the signal experiencing lower reflector antenna gain in the direction of the mobile with some of the signal being reflected away from the mobile and hence increasing interference to other mobiles in the vicinity. Increasing transmitted power reduces battery life and also increases the interference to others. Finally increasing correlation time also decreases battery life and increases background noise to others due to longer transmitted signal duration and demand longer time-to-fix periods. So it becomes useful for the mobile to dial down the effort it expends whenever high accuracy is not needed. In an embodiment, the mobile performs active transmitted power control and dynamic BW selection and correlation time selection to achieve the required range accuracy at the time.

In one embodiment, the mobile makes use of carrier phase measurement for relative movement location updates. Until now we have only considered position determination based on code phase methods. This limits position accuracy to a fraction of a PRN chip length the fineness of which depends on BW and SNR as outlined above. However, carrier phase methods can achieve position accuracies to within a fraction of a carrier center frequency wavelength. This is orders of magnitude finer resolution than code phase techniques. In any coherent receiver, the carrier phase is known but the integer number of wavelength that the signal traveled to and from the reflector is unknown. This is called the carrier integer ambiguity (N). If we know N and we also already know the residual phase of the carrier at Rx and Tx, we can calculate the range to a small fraction of a carrier wavelength absolute accuracy. Under favorable conditions, the user BW and available SNR are sufficient to narrow the variance of code phase determined range to below 1/2 carrier wavelength. Theoretically this is sufficient to determine N for carrier phase calculation and enable very accurate positioning. Practically one needs to get the code phase position variance down to less than ¼ carrier wavelength for reliable N determination. Once N is determined for one or more reflectors, we can relax the effort expended to determine N and keep an accurate knowledge of N for each reflector by continuously tracking the carrier phase of the received signal and incrementing or decrementing N with every complete phase wrap around in either direction. In other words, the mobile expends great effort to increase BW possibly by increasing chipping rate and or increasing SNR by higher Tx power or longer Rx correlation times to determine N, then switches to continuous carrier phase tracking to maintain very accurate positioning and relaxes by reducing BW and or SNR it needed for determining N. If at any time carrier tracking is lost due to environmental conditions, the mobile reverts back to rely more heavily on Code Phase methods for location determination and N determination again.

In embodiments that use carrier phase ranging techniques, the mobile compensates for the carrier phase shift that results when the main gain lobe of a frequency swept reflector swings as a function of excitation frequency. Without compensating for this effect, the full benefit of carrier phase ranging techniques may not be realized. Fortunately, the mobile knows the excitation frequency and is aware from the published reflector data of the angle of the main lobe and hence can estimate and compensate for this phase shift that is typical of frequency swept phased arrays.

In cases where the environment does not allow for reliable determination of N from code phase methods given the permissible BW and or SNRs, we can track the relative movement of the mobile by tracking relative N increments/decrements, through full period phase changes, and residual carrier phase changes from a previous positions enabling very accurate relative motion measurement. For a stationary mobile with stationary reflectors, this method admittedly does not yield additional information to determine absolute position. However, if the mobile is moving and is receiving reflections from multiple reflectors it becomes possible after some time, while keeping the tracking history, to determine this carrier phase N ambiguity and transition to the high accuracy absolute tracking mode especially if the geometry among reflectors and the mobile changes appreciably as is used by the Integrity Beacon Landing System using Pseudolites and GPS satellite signals (see, e.g., "Global Positioning System: Theory and Applications Volume II", by Parkinson and Spilker, 1996, Chapter 15 and as described in "GPS Pseudolites: Theory, Design and Applications", H. Steward Cobb, PhD Thesis, Stanford University, 1997). This method works if three or more reflectors are visible to the mobile.

In previous embodiment, the mobile tracks the carrier phase to maintain accurate positioning. This may not be possible due to multiple access restrictions in crowded environments. For such cases, a system employs techniques that can resolve N very quickly. Because N can be resolved with minimum time, no tracking is needed since it is just as efficient to determine N at every fix rather than determine N once and maintain carrier tracking after that. Higher chipping rates and multiple frequencies can be used to determine N quickly with minimum time and movement to enable carrier phase range accuracies even in crowded environments such a sports stadium.

In one embodiment, multiple frequencies are used along with higher chipping rate to produce enough information to resolve N on the fly and enable carrier phase ranging. Those unfamiliar with this art may, for example, refer to Stone, Jonathan et al, "Carrier Phase Integer Ambiguity Resolution Using Dual Frequency Pseudolites", 11$^{th}$ International Tech, Meeting of the Satellite Division of ION, September 1998, pp 961-968 and Forssen, B. "Comparison of wide-laning and tone-ranging", Electronic Letters Aug. 28, 1997, vol. 33, No. 18, pp. 1525-1526. Being reflector based, the systems disclosed herein do not need to correct for $\tau$ and therefore can resolve carrier phase ambiguity for each reflector independently from the position calculation process. In addition, in one embodiment, the excitation frequency is sometimes dithered slightly to allow for better probabilistic determination of N under circumstances that fixed frequencies can allow for.

Multi-Frequency Reflectors are built out of multiple collocated sweeping reflectors that respond to different RF bands. One reflector is designed to respond to sweeps from $f_0$ to $f_1$, while another is made to respond to a band from $f_2$ to $f_3$. If these reflectors are made to sweep along the same plane, the two sub-bands can only be partially overlapping or disjoint to insure that at any given excitation frequency, the direction of main gain is different from one reflector to the next and hence two frequencies are used for any reflector to mobile angle. The antenna ports of these collocated reflectors are connected to the same delay element by an RF combiner-splitter and hence have identical built-in delays. A mobile can now excite this multiple reflector using multiple frequencies and hence is able to resolve the carrier phase integer ambiguity N using one compound reflector and a short measurement time. This leads to increase system capacity in congested environment while still enabling carrier phase level accuracies.

In one embodiment, a system resolves the carrier integer ambiguity using frequency sweeping. A transmitted radar signal reflecting off of one of the reflectors, as, experiences a delay equal to the round trip free air delay in addition to the built in reflector delay. This delay translates to a number of integer carrier cycles and a residual carrier phase. By comparing the Tx phase to the Rx phase we can determine this residual phase. As we change the excitation frequency, the integer number of cycles as well as the residual phase both change. If we track this change as a function of swept excitation frequency, we would be able to determine the integer number of cycles of the reflected signal. Given the typical built in delays of the reflectors, on the order of microseconds, and the typical excitation frequencies, on the order of GHz, the expected number of round trip cycles would be in the hundreds or thousands of cycles. That means for a 0.1% frequency change in Tx, a full cycle or more is either added or subtracted from the round trip path. Mobiles can generate very accurate center frequencies. By sweeping the frequency while tracking the change in Rx carrier phase, including counting full cycle phase accumulation, we can determine the ratio of Rx phase change to Tx period fractional change which gives N. Having determined N, we now can calculate the range with high degree of accuracy, after subtracting the built in reflector delay.

A mobile may use only one reflector to determine 3D position, due to the angle provided by each reflector. For example each reflector can have a vertical sweeping reflector in addition to collocated horizontal sweeping reflector to give both azimuth and elevation angles. The accuracy of these angles depends on sweeping sensitivity and SNR. If however multiple reflectors are used, along with carrier phase techniques, the accuracy of such a system is not fundamentally limited and any accuracy can be achieved if enough BW, SNR, averaging is available at a given environment.

In an embodiment, the publicly accessible server, in addition to containing information about each reflector and also managing the available bandwidth in the vicinity to allow for fair multiple access can also exchange position location aiding information that can help each mobile determine its location accurately with less effort by using results published by other mobiles. An example of this aiding is the measured value of reflector built in delays. In one embodiment, each mobile can publish its location and also act as a reflector by publishing a specific delay it shall use and its own PRN sequence formula. A mobile would then know the PRN of another mobile and would detect the other's radar Tx signal, it would then delay it by the published amount, then retransmit it back coherently using the same PRN sequence of the other mobile. This makes this cooperative mobile act as another reflector, providing additional piece of ranging information but albeit without the angle information that a true passive frequency swept reflector could.

FIG. 1 is a functional block diagram of an indoor positioning system according to a presently disclosed embodiment. The system includes a mobile 185 whose location will be determined. The mobile 185 may be any electronic device (e.g., a smartphone). The system also includes a server 194. The mobile 185 communicates with the server 194 via a network 192. The network 192 may be, for example, a cellular network or a Wi-Fi network. The system also includes a position reflector 181. The mobile 185 transmits radar signals 182 and senses echoes from the position reflector 181 for use in determining the position of the mobile 185. For ease of illustration, the system of FIG. 1 includes only one position reflector; a location may include multiple position reflectors. Although the positioning system is particular suited for indoor use, it is not so limited.

Before transmitting the radar signal, the mobile 185 may determines its approximate (coarse) location or neighborhood. For example, the mobile 185 may use currently available positioning methods or may collect information from the environment that can be used for this neighborhood determination. One example of this coarse location determination is to save the last known outdoor GPS location which can be used to determine which building or collection of buildings the mobile 185 might be in. Alternatively or additionally, the mobile 185 may narrow its approximate position through detection of available Wi-Fi networks that have known locations. This approximate position could be a position with tens or hundreds of meters of uncertainty. Using this approximate position, the mobile 185 connects to the server 194. The server 194 may be communicated with using a known and published Internet protocol (IP) address. The connection from mobile 185 to server 194 may be routed through the Internet. The server may be a dedicated separate server or may be a shared server with capacity rented as needed from a server farm.

Having established a connection to the server 194, the mobile 185 sends, to the server 194, its approximate location or any environmental information through which the server 194 can approximate the coarse location of the mobile 185. The server 194 can then send to the mobile 185 a list of reflector data about reflectors that may be detectable within the approximate location of the mobile 185.

The mobile 185 then transmits a radar signal and listens for the reflections from reflectors on the server provided list of reflector data. As described further below, the mobile 185 is able to determine from which reflector, using the list of reflector data, the detected reflection came from, the range to the reflector, the angle-of-arrival (AOA) of the radar signal at the reflector, or both the range and AOA. Using the reflector data (e.g., information about the location, orientation, and frequency and delay characteristics of the reflector), the mobile 185 can determine its location accurately.

Once an initial accurate position is determined, the mobile 185 may limit its search for reflections to only those reflections that can come from reflectors that are located in the immediate vicinity. This may improve the position determination time-to-fix and can improve accuracy since the mobile 185 can now expend more effort, e.g. longer correlation time per hypothesis, towards detecting more than one reflector from a much reduced number of reflectors that are in the immediate vicinity and hence improve accuracy. Having determined its location accurately, the mobile can then track its differential position changes from this original fix very accurately, for example, by tracking the carrier phase cycle accumulation associated with each reflector. This may only done for the most demanding of applications since it may use more processing and more power consumption due to continuous tracking.

Figure 2:
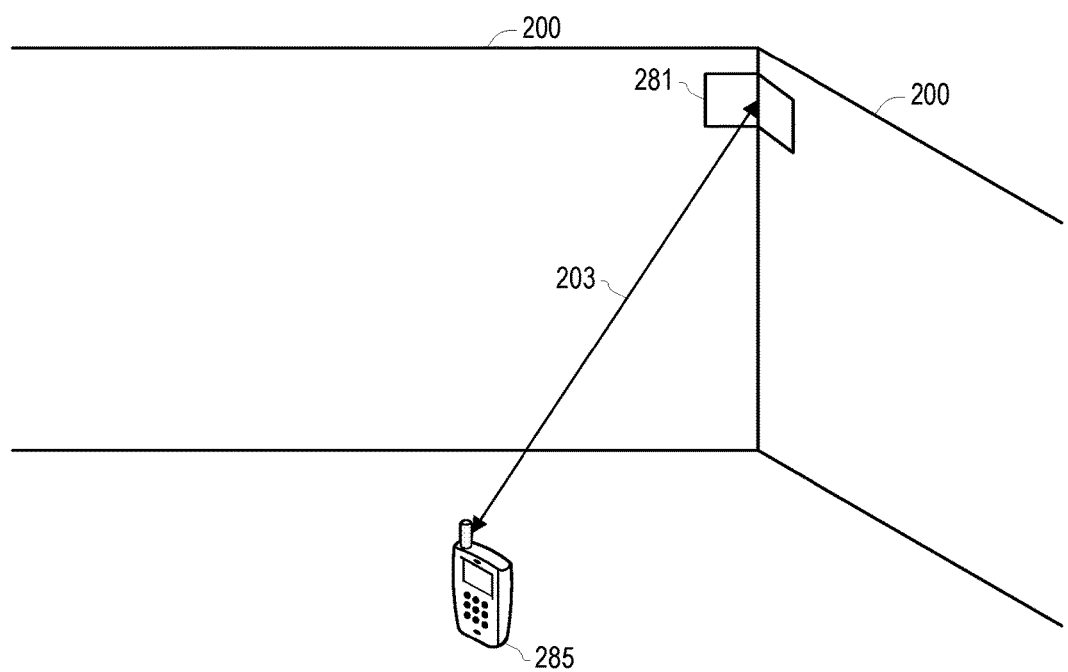
FIG. 2 illustrates an example location positioning according to a presently disclosed embodiment.

FIG. 2 illustrates an example location positioning according to a presently disclosed embodiment. FIG. 2 shows an example indoor room with walls 200 and a floor. A mobile 285 is equipped with position location technology as disclosed herein is present in the room. In the example of FIG. 2, a position reflector 281 is affixed to a corner of the room. When the mobile 285 wants to determine its position, it can emit a specially encoded radar signal. This signal may radiate omnidirectionally from the mobile 285. Some of this signal is radiated in the direction of the position reflector 281 along the path 203. The position reflector 281 in the example of FIG. 2 includes a frequency scanning antenna with angle of maximum gain, both in reception and transmission, that is a function of the center frequency of the incident signal. The mobile 285 scans the radiated signal in frequency until maximum reflected power is detected. With the mobile already knowing the location, orientation, and frequency scanning characteristics of the position reflector 281, for example, from server provided information, the mobile is able to determine the AOA of the line of sight vector to the reflector and hence the azimuth and elevation angles of the vector between the mobile 285 and the reflector position along path 203.

In addition, the mobile 285 measures the round trip delay of the reflected signal and calculates the range distance between the mobile 285 and the position reflector 281. Having determined two angles and the distance between the mobile 285 and the position reflector 281, whose location and orientation within the room is known, the mobile 285 is able to determine its location in 3D space by detecting only one reflector.

FIG. 3 illustrates another example location positioning according to a presently disclosed embodiment. The space of FIG. 3 is similar to the space of FIG. 2. However, the space of FIG. 3 includes two position reflectors (a first position reflector 381a and second position reflector 381b, collectively position reflectors 381). Here, each of the position reflectors 381 could yield two AOA angles and a range to provide an over-determined position calculation resulting in higher accuracies. Alternatively, the position reflectors 381 could be a simpler type of reflector that yields only one angle and one range measurement. This still provides an overdetermined position calculation with only two visible position reflectors. If a mobile is able to detect reflections from three or more position reflectors, the position reflectors need only provide a single AOA each, only a range measurement each, or any minimum combination of three measurements for the mobile to determine its location. Each reflector can still provide two AOAs and a range for more accuracy or robustness, for example, through detection of erroneous location determination.

Reflectors types include three categories: the simple passive reflector, the frequency scanned passive reflector, and the active retro-directive reflector. Regardless of their type, all reflectors delay the received radar signal by an internal delay before reflecting the signal back. These intentionally included delays are typically in a range between 0.5 microseconds and 3 microseconds. They serve four purposes. The first is that they delay the signal until all ambient multipath signals and echoes from parasitic reflecting items, such as a large facing mirror, have died. Secondly, the delay increase the time between sending the radar signal and receiving it. This increased time makes it feasible for the mobile device to alternate between active TX, when the radar signal is being transmitted, and active RX, when the signal echoes are expected to be received. This eliminates the self-jamming problem because both RX and TX are at the same frequency. Thirdly, the preferred embodiment of the mobile circuitry is to emit a radar signal that uses direct sequence spread spectrum modulation (DSSS). In a DSSS receiver, echoes from different reflectors and the environment can only be distinguished if they arrive more than one DSSS chip apart. These inserted delays at the reflectors insure that. Finally, these inserted and differing delays serve as an identifying mark for the mobile to pair up detected refection with their respected reflectors.

Reflectors may also have a property referred to as double-delayed-reflection (DDR). If a reflector includes a delay element of d microseconds, the reflector initially echoes back signals it receives d microseconds after it receives them. With DDR, the reflector generates two echoes. The first echo is delayed by d microseconds and may be referred to as the primary reflection. The second echo is lower in power (e.g., −10 dB relative to the primary reflection) and delayed by 2 d or 3 d microseconds. DDR can facilitate eliminating calibration requirements for the reflector delays.

FIG. 4 is a functional block diagram of a position reflector according to a presently disclosed embodiment. The position reflector of FIG. 4 may be referred to as a simple passive reflector. The position reflector of FIG. 4 may be used to implement the position reflector 181 of FIG. 1, the position reflector 281 of FIG. 2, or the position reflector 381 of FIG. 3. The position reflector of FIG. 4 includes an antenna 410. The antenna 410 connects at an antenna port 411 to one port of a delay element 425 through a matching network 420. The matching network 420 may include a resistor network, a transformer, or other passive circuit elements. In some embodiments, a matching network may be reduced or omitted, for example, when the impedances to be matched are the same or similar. The other port of the delay element 425 connects to ground. RF signals received by the antenna 410 are delivered through the matching network 420 to the delay element 425. The signal travels one delay through the delay element 425 and shows up at the opposite port where it is reflected back by the short to ground through the delay element 425 and then reradiates from the antenna 410. If the delay of the delay element 425 is t microsecond each way, the reflector has 2t microsecond Rx to Tx delay. In addition, through slight detuning (impedance mismatching) of the matching network 420, part of the delayed signal coming back from the delay element 425 gets reinjected back into the delay element for an additional round trip. Thus, another reflection is radiated by the antenna at time 4t microseconds. The power level of this reflection is lower than the initial (primary) reflection (e.g., by 10 dB or more depending on detuning of the matching network).

FIG. 5 is a functional block diagram of another position reflector according to a presently disclosed embodiment. The position reflector of FIG. 5 is similar to the position reflector of FIG. 4 with like referenced elements perform like functions. The position reflector of FIG. 5 includes a circulator 527 that split the Rx and Tx paths. The Rx path is fed to one port of the delay element 525 and the other port of the delay element 525 feeds the Tx path. For this reflector, the initial reflection comes after t microseconds and the second weaker reflection comes after 2t or 3t microseconds. Operating these reflectors in the 2.4 GHz or 5.0 GHz bands may provide for convenient component sourcing but such reflectors may work at other frequencies. The delay elements may be SAW or BAW delay lines for 2.4 GHz and may be BAW delay lines for higher frequencies such as 5.0 GHz.

These simple passive reflectors contain no power source thereby providing convenient installation and service. These reflectors have no regenerative gain stages. Thus, the insertion loss of the delay elements directly affects the reflected signal power level. At gigahertz operating frequencies, 20 dB insertion loss in the delay element may occur for the initial reflection.

The simple reflectors (e.g., as illustrated in FIGS. 4 and 5) provide only ranging information and no AOA information. To determine the position of the mobile in 3D space, the mobile can get reflections from multiple non-planar reflectors within the vicinity.

Figure 6:
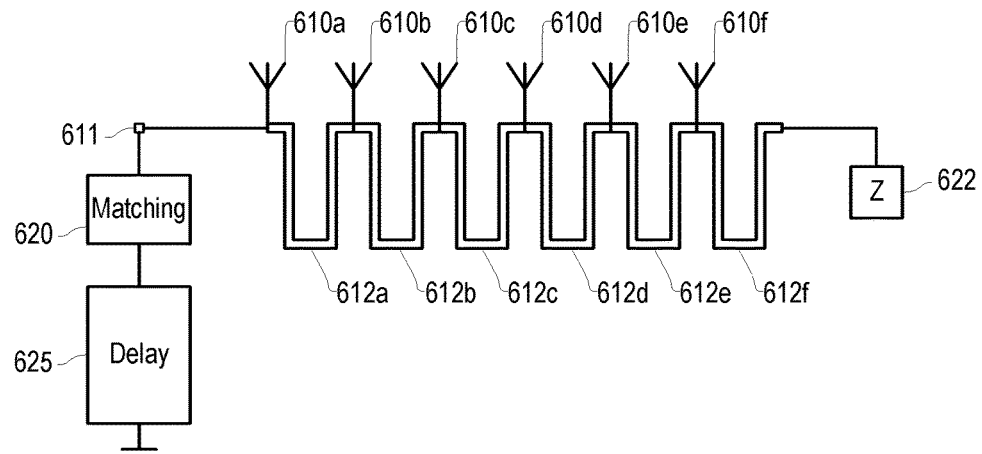
FIG. 6 is a functional block diagram of another position reflector according to a presently disclosed embodiment.

FIG. 6 is a functional block diagram of another position reflector according to a presently disclosed embodiment. The position reflector of FIG. 6 includes a frequency scanned phased array antenna and may be referred to as a frequency scanned phased array reflector. The position reflector of FIG. 6 may be used to implement the position reflector 181 of FIG. 1, the position reflector 281 of FIG. 2, or the position reflector 381 of FIG. 3.

The position reflector of FIG. 6 includes an array of antennas 610a-f. The antennas may be arranged on a straight line. Increasing the number of antenna and the linear extent of the reflector increases directional gain and narrows the 3 dB beam width of the main gain lobe. The antennas are coupled to other circuitry in the reflector through an antenna port 611. Each antenna may be physically separated from adjacent antennas by distance D. The separation may correspond to one-half a wavelength of a center frequency of signals used with the reflector.

A plurality of transmission paths 612a-f sequentially couple the array of the antennas. The transmission paths may be referred to as delay lines. The signal from the antenna port 611 is routed to the first antenna 610a where a power splitter/combiner imparts a fraction of the energy to the first antenna 610*a* and the remaining energy continues on via the first transmission path 612*a* to feed the other antennas. The signal feeding a subsequent antenna is delayed by the connecting transmission path. Each transmission patch may have an electrical length L. Finally after feeding all of the antenna, the signal is terminated with a termination 622. The termination 622 may have an impedance matching that of the antennas and transmission patch so as to prevent (or reduce) residual power reflecting back to the antennas.

This structure of antennas and transmission paths of the reflector may be referred to as a frequency scanned array (see, e.g., "Introduction to Radar Systems", M. Skolnik, New York, McGraw-Hill, 3rd Edition, 2001. Chapter 9). The phase difference between two adjacent antennas $\emptyset$ equals $2\pi L/\lambda$ where $\lambda$ is the wavelength of excitation. Thus, $\Delta\lambda = 2\lambda_0 (D/L) \sin \theta_1$. Where $\theta_1$ is the angle of maximum reflection offset from a broadside direction. The direction of maximum reflection changes as the excitation wavelength $\lambda$ deviates from $\lambda_0$, the center wavelength at which maximum broadside radiation occurs. For example, if L/D=20, varying the excitation frequency by ±7% results in a sweep of ±45°. In an embodiment with sufficient bandwidth available for a 90° scan, this simple structure may be used for indoor positioning as described herein. In other embodiments, the available span of frequency for scanning may not be more than ±1% of center frequency. Under such scenarios, two techniques may be used. In one embodiment, L is made as large as needed to enable a 90° scan of the main gain lobe with the available BW. The transmission paths may be made by appropriate lengths of embedded transmission lines. At high frequencies, such in the 24 GHz civilian radar band, the required length L is manageable. However, for lower frequencies, such as below 5 GHz bands, a large L/D requires a fairly long transmission line that is physically large. Such embodiments may use, for example, loaded transmission lines, ferromagnetic waveguides, BAW filters, SAW filters, distributed LC delay lines, CRLH meta-material delay line structures, ceramic waveguides, and/or micro-electro-mechanical systems (MEMS) delay lines to keep the size manageable. Also, active gain components can be inserted in the delay paths to reduce the loss within these passive delay lines if a very high L/D factor is desired.

In an alternative embodiment, the 90° scan is divided among N adjoining sectors. Each sector may have a 90°/N scan capability. Each sector can include a frequency scanning reflector that can scan a minimum of a 90°/N angle. Making all collocated sectored scanning antennas scan in the same direction, clockwise for example, insures that at sector boundaries only one antenna sector would be at maximum gain. Distinguishing among sectors may use, for example, the various methodologies to distinguish among reflectors described herein.

The position reflector of FIG. 6 includes a delay element 625 with a first port coupled to the antenna port 611 via a matching network 620. The delay element may be the same or similar to the delay element 425 of FIG. 4 (e.g., an RF delay passive device, such as a BAW or a SAW filter). The other port of the delay element 625 is shorted to ground. Here incident radiation on the reflector is delayed by the round trip delay within delay element 625 before re-radiating from the reflector. The delay allows other parasitic reflections within the vicinity to die down before reflecting the signal from the reflector back to the mobile. This can significantly reduce the effects of room multipath and improve the SNR at the mobile.

In one embodiment, the delay of the delay element 625 is longer than any free air round trip delay and nearby reflectors have different delays allowing the mobile to distinguish among reflections coming from different reflectors when the using, for example, linear frequency modulation (LFM), non-linear FM, or windowed (LFM) in encoding the radar signal.

In one embodiment, the signal radiated from the mobile is modulated using direct sequence spread spectrum (DSSS) techniques. This is done for example by using BPSK or QPSK modulation employing a pseudo random number (PRN) sequence, or a true random sequence (TRN), at a given chip rate. If the delay of delay element 625 for a given reflector differs from other reflectors by more than one PRN chip period, then the mobile can distinguish among multiple reflections coming from different reflectors.

In one embodiment, the matching network 620 is slightly detuned from providing a perfect match between the antenna structure and the delay element 625. This results in part of the incident signal being reradiated back after one roundtrip delay through delay element 625 and part being reflected back into the delay element 625. This results in multiple reflections being reradiated by the reflector in response to an incident radar signal. The most powerful reflection occurs after $t_{r1} = 2t_{air} + 2t_{delay}$, where $t_{air}$ is the free air time of flight from mobile to the reflector and $t_{delay}$ is the one way delay through delay element 625. Another weaker reflection is emitted after $t_{r2} = 2t_{air} + 4t_{delay}$. From these two equations the mobile can accurately calculate $t_{air}$ and $t_{delay}$ thus compensating for delay drift in delay element 625 (for example, due to temperature or aging) and hence accurately determining the range to the reflector.

Figure 7:
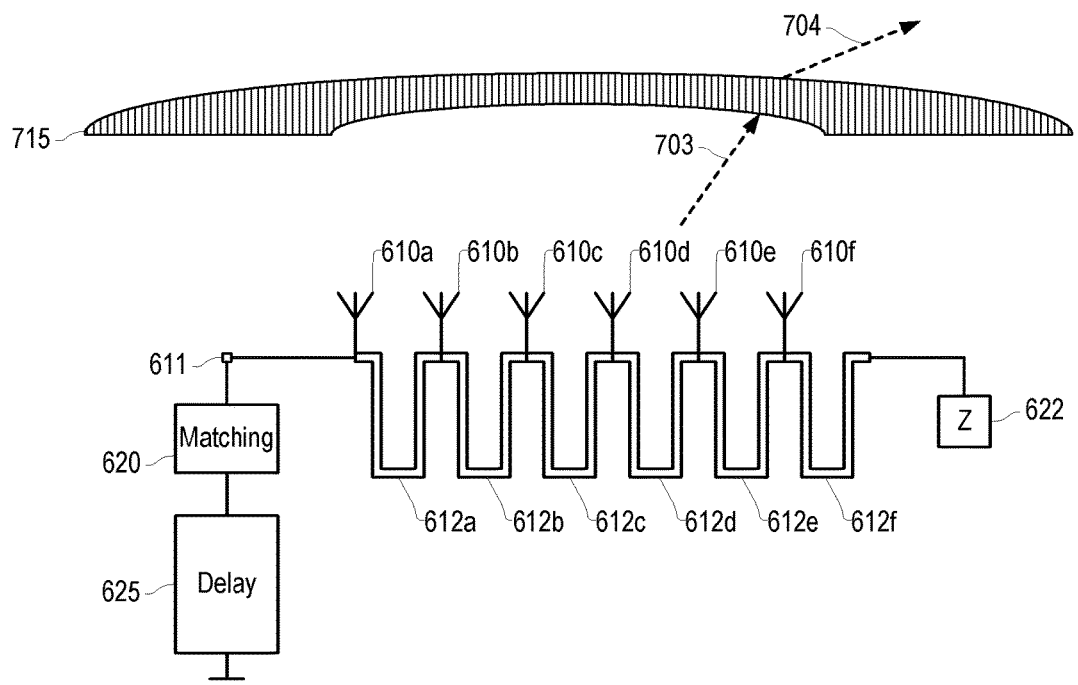
FIG. 7 is a functional block diagram of another position reflector according to a presently disclosed embodiment.

FIG. 7 is a functional block diagram of another position reflector according to a presently disclosed embodiment. The position reflector of FIG. 7 is similar to the position reflector of FIG. 6 with like elements performing like functions. The position reflector of FIG. 7 includes a spreading lens 715. Radiation leaving the antenna structure along the path 703 passes through the spreading lens 715 where it is diffracted and continues on in along path 704. This has the effect of increasing the antenna scan angle for a given frequency sweep. This antenna structure may be particularly practical at higher (e.g., >10 GHz) frequencies. This lens has inverse directivity compared, for example, to a collimating lens.

Antenna structures in FIGS. 6 and 7 provide scanning in one direction and hence can provide one AOA. To provide two AOAs for single reflector position determination, the indoor positioning system can use two copies of a reflector structure collocated and mounted orthogonally to each other to provide the two orthogonal angles. Many variations on these reflectors are possible, for example, reflectors with non-uniform arrays of elements. In another reflector variation using a reflector antenna based on meta-material. An example of this reflector adds a delay element to a meta-material CRLH leaky wave passive retro-directive reflector (see, e.g., "Electromagnetic Metamaterials: Transmission Line Theory and Microwave Applications," 2005, by Christophe Caloz and Tatsuo Itoh, section 6.4.1). A delay element as described herein is inserted between the antenna terminal and a short that would create a retro-directive reflector with the delay simplifying the radar processing. Such a reflector is advantageously retro-directive, passive, has one leaky radiating element and thus can use only one delay element. Being made from CRLH (meta-material) can improve on the standard material leaky wave antenna performance through allowing wider reflection angles (e.g., almost 180 degrees).

Figure 8:
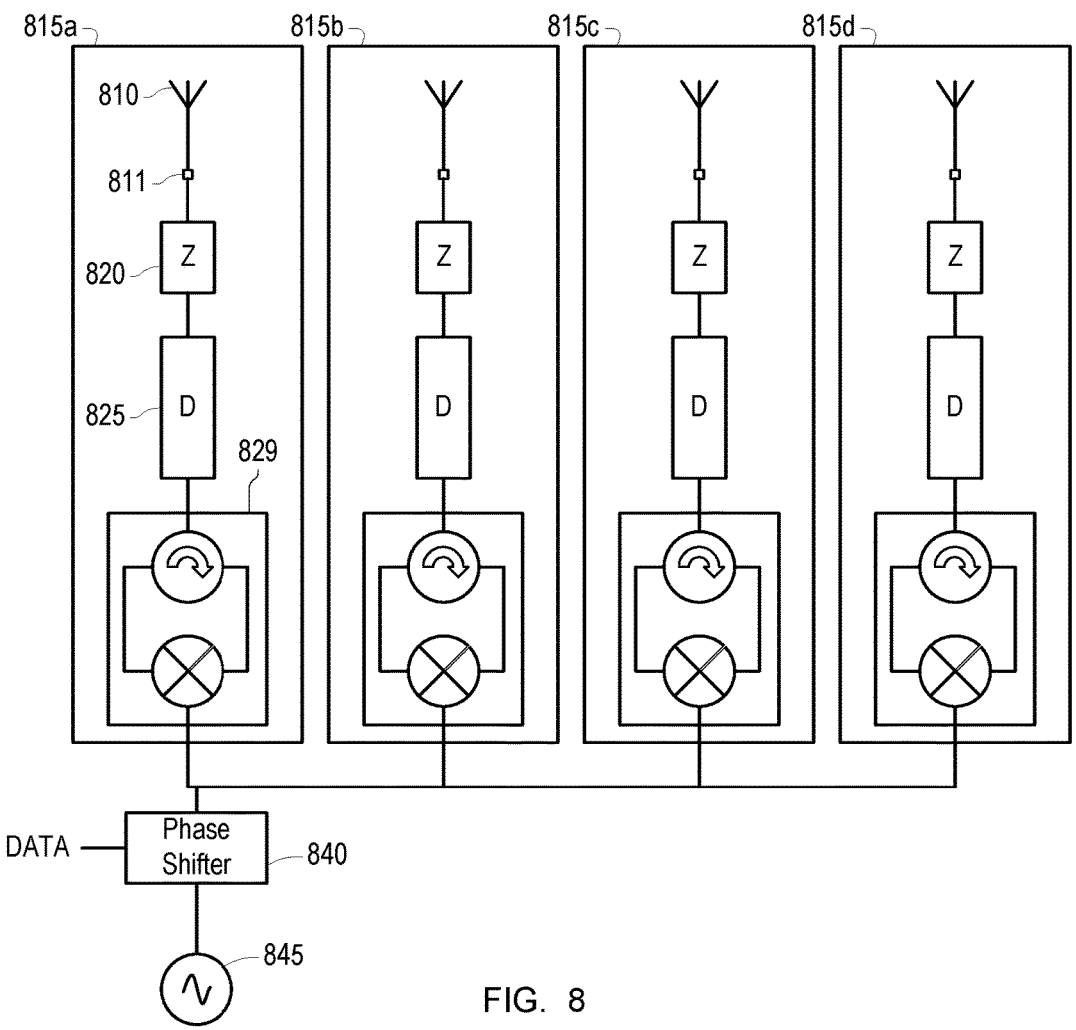
FIG. 8 is a functional block diagram of another position reflector according to a presently disclosed embodiment.

FIG. 8 is a functional block diagram of another position reflector according to a presently disclosed embodiment. The position reflector of FIG. 8 may be referred to as a phase conjugation array (PCA) reflector. Such reflectors may be particularly suitable, for example, in commercial installations where a power source may be available at the position reflector. Since only a few reflectors per large space are used, the number of power sources is small.

The position reflector of FIG. 8 includes an array of reflector elements 815a-d. Each reflector element includes an antenna 810. The antenna is coupled at an antenna port 811 to a first port of a delay element 825 via a matching network 820. The delay element 825 and the matching network 820 may be implemented as described for other reflectors. Likewise, the matching network 820 can be detuned to provide double delayed reflection. The second port of the delay element is coupled to a reflector mixer 829. The reflector mixer 829 reflects a signal that is the incident signal mixed with a signal form a local oscillator 845. As illustrated in FIG. 8, the reflector mixer 829 may include a circulator and a mixer. The circulator has a first terminal coupled to the delay element 825, a second terminal coupled to a first mixer input and a third terminal coupled to a mixer output. The mixer has a second input coupled to the local oscillator and produces the mixer output by mixing the signals on the first and second inputs. The mixer may be active or passive.

If the local oscillator frequency is twice the frequency of the incident wave, the PCA reflects the incident wave retro-directively back toward the source. This retro-directivity can be reduced the more the excitation frequency deviates from one-half the local oscillator frequency. This frequency sensitivity can be used to distinguish among close by reflectors with different center frequencies as well as provide a way for the mobile to find out the AOA at the reflector by dithering the transmitted frequency around a given reflector's retro-directive center frequency. Additionally, the spacing for a PCA is unimportant and hence the structure can conform closely to the supporting walls, ceilings, or floors.

The reflector of FIG. 8 includes a digital phase shifter 840. The phase shifter 840 modulates the signal from the local oscillator by a data sequence to produce either a 0° or a 180° round trip phase shift. The data sequence may be a short repeating code with low data rate (e.g., orders of magnitude lower rate than the chipping rate of the mobile DSSS signal). Because the data rate of the data sequence is much slower than the chipping rate, the mobile can detect its signal and at the same time reconstruct the transmitted data bits from the reflector. These data bits can uniquely identify the respective reflector. The mobile may use, for example, techniques similar to those used in GPS receivers for recovering the 50 Hz data stream. This technique of signaling a data sequence using a phase shifter can be used for other position reflectors, for example, the reflector of FIG. 4.

The reflector of FIG. 8 can provide range information but may not provide AOA information to the mobile. However, such a reflector does reflect the mobile signal retro-directively and hence increases the number of mobiles that can be served at the same time within a vicinity, for example, due to RF space diversity and lower required SNR. This is particular important for large venues with lots of users, for example, in malls, sports arenas, and the like.

Each PCA-based reflector yields one range measurement. A mobile can determine its location accurately by detecting reflection from four or more of these PCA based reflectors. For accurate ranging, the delay elements 825 in the different reflector elements 815 should be tightly matched. Since the reflector is an active device, digital delay lines can be used, for example, instead of SAW or BAW devices. A digital delay line can include a downconverter to convert the signal into a lower frequency, an analog-to-digital converter, a digital delay shift register, follow by a digital-to-analog converter, and an upconverter to return the signal to its original frequencies. Delay elements realized this way are perfectly matched (or nearly so). Alternatively, the paths can be combined into one path and sent into one SAW or BAW delay element. After passing through the same SAW or BAW, the signals are split again into their own separate paths. The signals may be kept from mixing while passing through the same delay element by using frequency division or code division RF techniques. Such an approach uses only one delay element. Because each path is delayed by the same physical SAW or BAW element, the delays are matched.

In a variation of the reflector of FIG. 8, all of the signals are multiplexed through one delay element using CDMA technique. The signal from each matching circuit 820 is passed through a circulator to separate the Rx path from the Tx path. The Rx path of each antenna is then mixed with a PN sequence that is unique for each path. After PN mixing, all of the paths are combined and passed through the same delay element. Exiting the delay element, the combined signal is split into one path per antenna. Each path is then mixed again with its corresponding PN sequence that was used before combining but delayed by the known delay of the common delay element. The signal is passed through a band-pass filter to remove mixing harmonics. Then, each path is mixed with the local oscillator (after phase shifting when included) frequency (which is at twice the center frequency of the radar signal) to generate their phase conjugate signals. After this mixing, the signal is filtered to remove harmonics and the high frequency product component and then passed on to the Tx side of the path circulator. In doing the above, each received signal is conjugated and delayed by the same delay as all the other paths because all paths use the same delay element. The full structure is then a retro-directive reflector with a built in delay.

In another embodiment, the reflector is a composite reflector including four or more reflectors of the types illustrated and described above, where each is retro-directive and reflections from each are distinguishable from others within the composite reflector. The reflectors are arranged not to be along a single linear line in order to provide both azimuth and elevation angle determination. Phase differences among each of the reflectors within a composite reflector are distinguished by a RAKE receiver and hence the two AOA at the composite reflector can be determined.

More than three reflectors are used since the distance between neighboring reflectors within a composite reflector is more than one wavelength and hence the integer wavelength ambiguity has to be resolved for correct AOA determination. The additional reflectors should not be placed equidistant in order to generate enough information to resolve the ambiguity. Center frequency detuning, reflected power, and frequency dithering can also be used to resolve the integer ambiguity among reflectors within a composite reflector.

Figure 9:
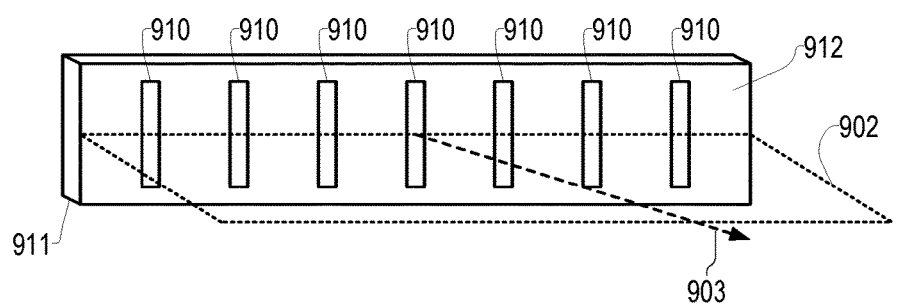
FIG. 9 is an isometric diagram of a position reflector according to a presently disclosed embodiment.

FIG. 9 is an isometric diagram of a position reflector according to a presently disclosed embodiment. The position reflector of FIG. 9 may be used, for example, to implement the reflectors of FIGS. 6, 7, and 8. The reflector includes a printed circuit board 911 that has multiple conducting copper layers in addition to the top and bottom layers. The top layer 912 is patterned to contain a number of radiating elements (antennas) 910. These radiating elements could be any geometric shape, for example, based on the desired radiation patterns. The radiating elements are illustrated as rectangles only to provide a clear example. Layers in between the top and bottom layers can be used for constructing the branching feeding networks. The bottom layer can have traces to mount passive or active circuitry. Since the radiating elements are repeated horizontally, the direction of maximum radiation aligns with the vector 903 that is coincident with plane 902. This imaginary plane intersects the reflector with a horizontal line due to the horizontal distribution of the radiating elements 910. However, depending on the shape of the radiating elements 910, the plane 902 need not be normal to the plane of the reflector. Also, the radiating elements need not be identical. Also note that the phasing between the radiating elements could be done in a way that results in asymmetric scanning of maximum radiation direction with frequency. For example vector 903 could scan more to the right than the left.

Figure 10:
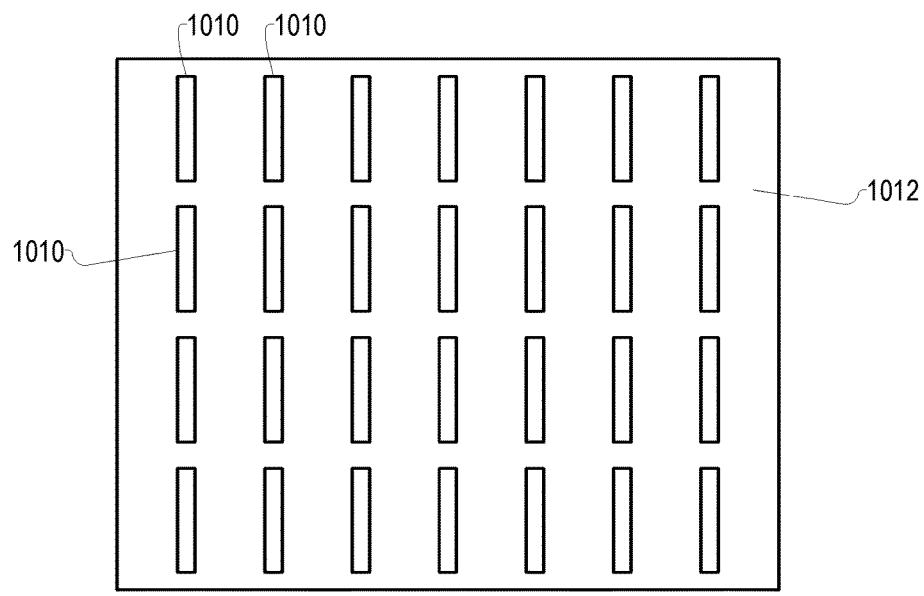
FIG. 10 is a plan view of a position reflector according to a presently disclosed embodiment.

FIG. 10 is a plan view of a position reflector according to a presently disclosed embodiment. The reflector of FIG. 10 may be referred to as a sectored reflector. For sectored reflectors, multiple linear reflectors of FIG. 9, each with a different phasing bias are stacked next to each other to result in a flat sectored reflector.

Figure 11:
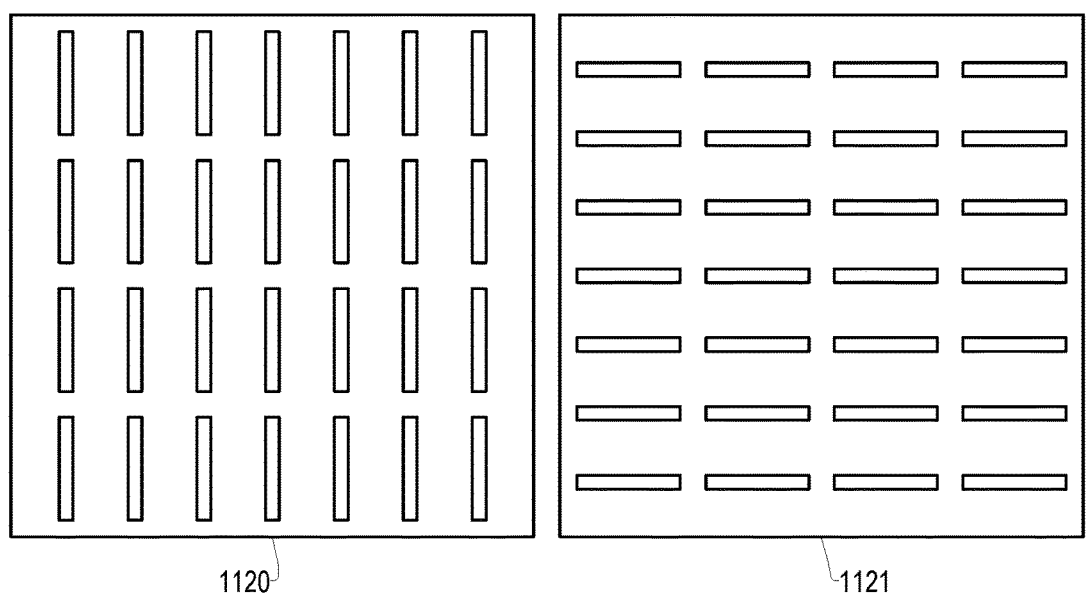
FIG. 11 is a plan view of another position reflector according to a presently disclosed embodiment.

FIG. 11 is a plan view of another position reflector according to a presently disclosed embodiment. The reflector of FIG. 11 can yield two AOAs. The reflector includes two adjacent reflectors. Each could be, for example, a single linear reflector as shown in FIG. 9 or a sectored reflector as shown in FIG. 10. A first reflector 1120 is oriented with horizontal radiation plane, and a second reflector 1121 is rotated relative to the first reflector 1120 such that the radiation plane is vertical.

Figure 12:
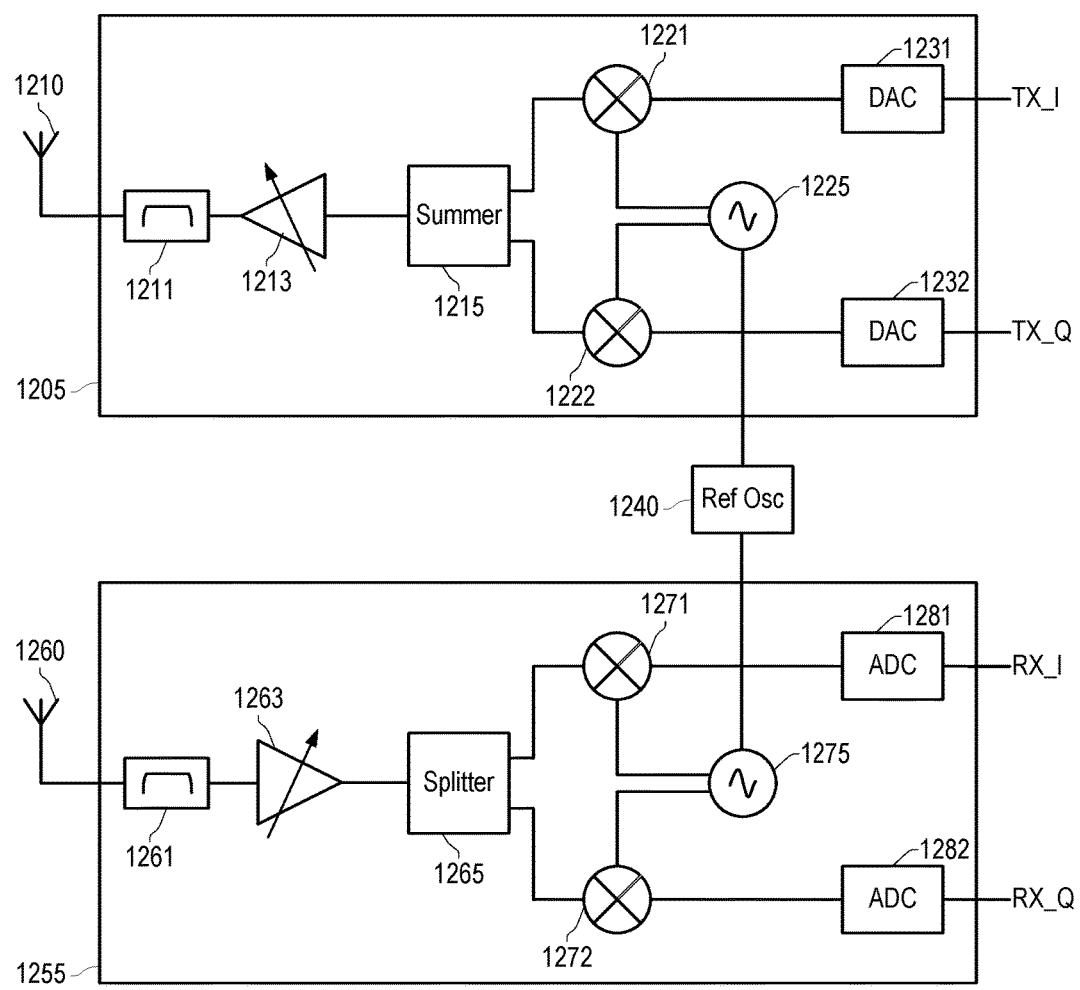
FIG. 12 is a functional block diagram of transmit and receive radar chains according to a presently disclosed embodiment.

FIG. 12 is a functional block diagram of transmit and receive radar chains according to a presently disclosed embodiment. A transmit chain 1205 and a receive chain 1255 may be implemented in a mobile device, for example, using complementary metal oxide semiconductor (CMOS) system-on-a-chip integrated circuits. The illustrated transmit and receive chains are exemplary and other suitable arrangements may also be used.

The transmit chain 1205 includes an I and Q modulator. For the transmit chain 1205, digital data samples for the in-phase (TX_I) and quadrature-phase (TX_Q) values are supplied, for example, from a digital signal processor (DSP)). The I and Q sample streams could be carrying DC centered, or low IF centered sampled data. The data is converted to analog levels using digital-to-analog converters (DACs) 1231, 1232, which may also contain anti-aliasing filters. The sampling clock of the DACs may be synchronized with a local oscillator (LO) to maintain coherence. The sample clock is at least double the bandwidth of the transmitted signal to avoid aliasing. A local oscillator (LO) containing a phase locked loop (PLL) 1225 is phase locked to a frequency reference 1240 and generates IQ signals to up convert the base band I and Q signals to the carrier frequency using I and Q RF mixers 1221, 1222. The up converted I and Q signals are summed and filtered in the summing network 1215. The combined signal then passes through a variable gain amplifier 1213 to adjust the transmitted output power as controlled by a power control algorithm, which may be in a baseband or application processor. The signal then passes through a band selection filter 1211 to remove spurious out of band emissions and is then passed on to a transmit antenna 1210.

For the receive chain 1255, the received signal is first routed from a receive antenna 1260 to a band selective filter 1261 to reject out-of-band signals and improve overall signal-to-noise ratio (SNR). The signal is then fed to a variable gain and variable IP3 low noise amplifier (LNA) 1263. Coming out of the LNA 1263, the signal is split using a power splitter 1265. The split signal is down converted to either base band or low IF I and Q signal streams using RF mixers 1271, 1272. The signals are then filtered and sampled by combined filter and analog-to-digital converter blocks (ADCs) 1281, 1282. The ADC clocks and receive LO from a receive PLL LO generator 1275 are both synchronized with the frequency reference 1240 and thus with the transmit chain thereby maintaining coherence. The digital samples out of the ADCs exit the receive chain as in-phase samples (RX_I) and quadrature samples (RX_Q). The I and Q receive digital data streams are sent to a receive DSP in the mobile for further processing.

The transmit and receive chains of FIG. 12 use separate antennas. This embodiment can be used for half duplex and can provide some TX-RX isolation during full duplex operation.

Figure 13:
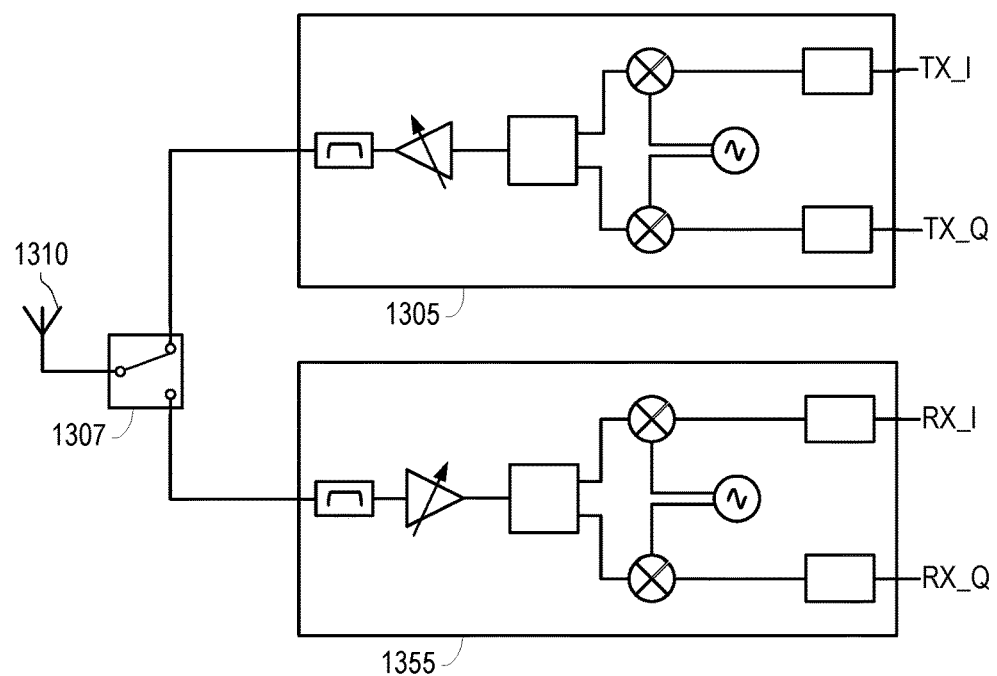
FIG. 13 is a functional block diagram of further transmit and receive radar chains with an alternative antenna arrangement according to a presently disclosed embodiment.

FIG. 13 is a functional block diagram of further transmit and receive radar chains with an alternative antenna arrangement according to a presently disclosed embodiment. The embodiment illustrated in FIG. 13 is similar to that of FIG. 12 but the transmit and receive chains share an antenna. The transmit chain 1307 and receive chain 1355 are connected to one antenna 1310 through a transmit/receive (T/R) switch 1307. The T/R switch 1307 alternately connects the antenna to either the transmit chain 1305 or the receive chain 1355. This is used where transmitting and reception of the radar signal is done at half duplex. In half duplex operation, the mobile transmits the radar signal for a short time and then turns off the transmitter and listens for reflections. An advantage of this arrange is that the transmitted radar signal is turned off when the mobile is listening for reflections and hence is immune to Tx/Rx leakage. However, half duplex can complicate Rx/Tx scheduling when multiple reflectors with multiple distinct delays are present.

Figure 14:
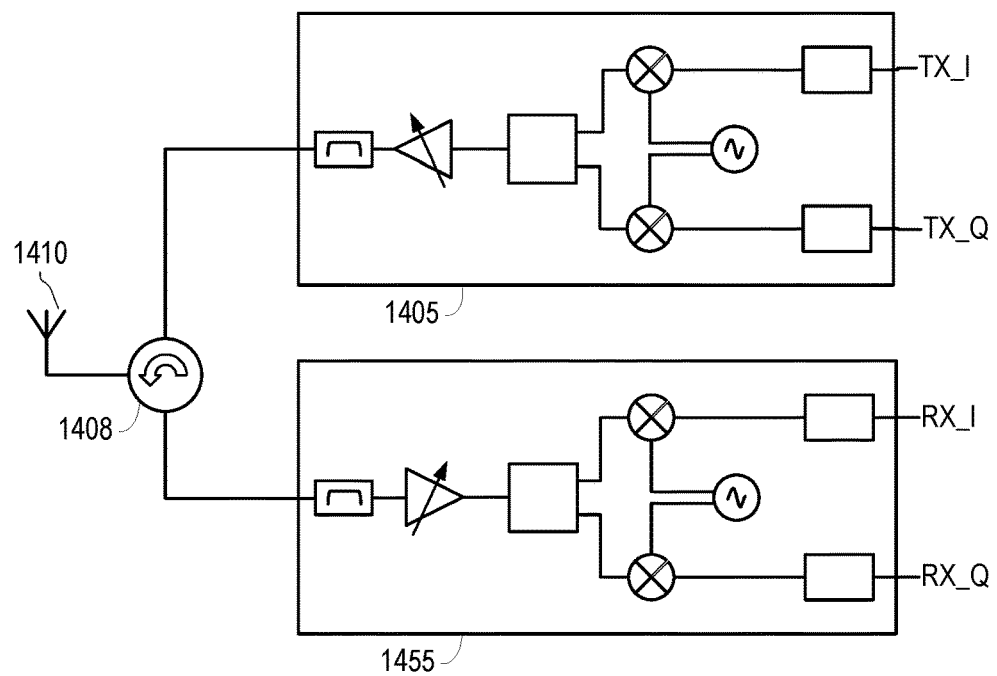
FIG. 14 is a functional block diagram of further transmit and receive radar chains with another alternative antenna arrangement according to a presently disclosed embodiment.

FIG. 14 is a functional block diagram of further transmit and receive radar chains with another alternative antenna arrangement according to a presently disclosed embodiment. The embodiment of FIG. 14 is similar to that of FIG. 13 but use an alternative antenna connection. In FIG. 14, both the transmit chain and the receive chain may be operating simultaneously in full duplex operation. The signals are routed to the antenna 1410 through a circulator 1408. The circulator 1408 can provide, for example, about 20 dB Rx-Tx isolation. Additional isolation may be done by measuring an attenuated copy of the Tx signal and canceling it from the Rx signal using echo cancellation digital signal processing. Finally, additional isolation may be provided by a more than one chip delay offset between the Tx and Rx DSSS signals due to the a reflector's longer than one chip period built-in delay.

In a mobile using the arrangement of FIG. 14, even though both Tx and Rx can operate at the same time, the Tx signal may be periodically silenced, for example, by turning off Tx gain stages and power amplifiers. For example, if position reflectors have delays that cluster around 3 microseconds, the Tx signal is transmitted for 3 microseconds and turned off for 6 microseconds. While transmitting, the receiver in turned off. When the Tx is turned off, the Rx section receives and processes data. The 6 microseconds are used to receive the primary and secondary reflections of DDR. Using DSSS signals, this can result in a −4.8 dB loss but can greatly simplify the design, for example, because it eliminates self-jamming.

Figure 15:
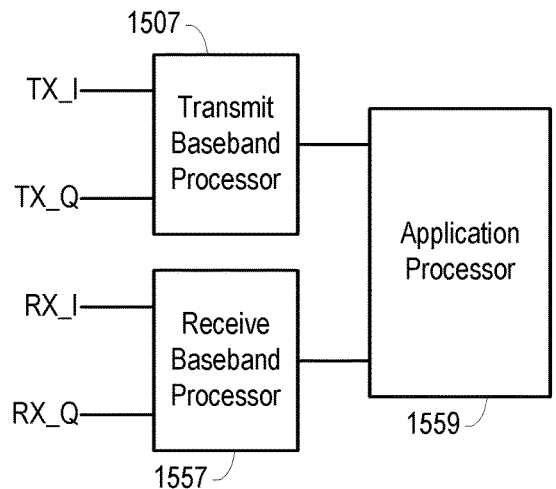
FIG. 15 is a functional block diagram of location signal processing according to a presently disclosed embodiment.

FIG. 15 is a functional block diagram of location signal processing according to a presently disclosed embodiment. The location signal processing may be performed by mobile for position location. A transmit digital signal processor 1507 supplies in-phase (TX_I) and quadrature-phase (TX_Q) values. The values may be supplied, for example, to the transmit chain 1205 of FIG. 12. A receive digital signal processor 1557 receives in-phase (RX_I) and quadrature-phase (RX_Q) values. The values may be received, for example, from the receive chain 1255 of FIG. 12. The transmit digital signal processor 1507 and the receive digital signal processor 1557 may be physically disjoint or may be the same processor running both transmit and receive processing algorithms concurrently. The transmit digital signal processor 1507 and the receive digital signal processor 1557 are administered by an application processor 1559. In addition to processing the transmit and receive data streams, in various combinations, the transmit digital signal processor 1507, the receive digital signal processor 1557, and the application processor 1559 control other aspects of the transmit and receive chains, such as LO frequency selection, Tx output power control, Rx input Low Noise Amplifier (LNA) gain and IP3 control, T/R switch control, and transmit/receive scheduling among other RF chain book keeping operations. Using programmable block for processing gives the mobile a great deal of flexibility in selecting the appropriate modulation method, bandwidth, and center frequency for the transmitted radar signals along with the appropriate reciprocal processing in the receive chain to detect range and AOA for a given the transmitted waveform.

Figure 16:
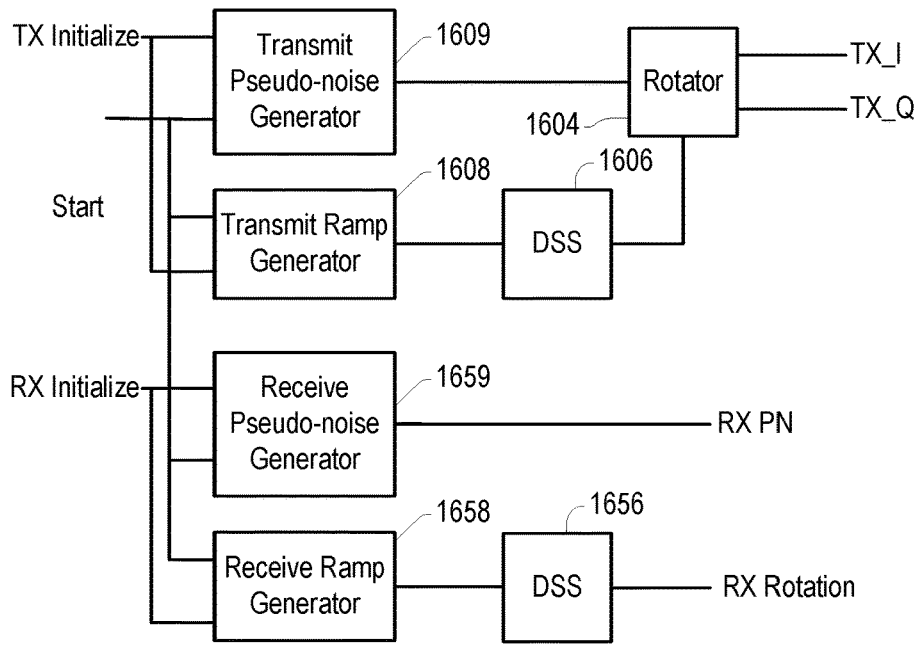
FIG. 16 is a functional block diagram of transmit location signal processing according to a presently disclosed embodiment.

FIG. 16 is a functional block diagram of transmit location signal processing according to a presently disclosed embodiment. The blocks of FIG. 16 may be used, for example, in the transmit digital signal processor 1507 of FIG. 15. The transmit location signal processing of FIG. 16 includes a transmit pseudo-noise generator 1609 that generates a pseudo-random sequence of {+1,−1} samples. The transmit pseudo-noise generator 1609 may generate the sequence by a maximal polynomial using a linear feedback shift register (LFSR). A transmit rotator 1604 can rotate transmit I and Q samples. An embodiment may use samples with BPSK modulation on the I channel and nothing on the Q channel. These I and Q samples are rotated in the transmit rotator 1604 before passing on to the next stage of the Tx chain. The transmit rotator 1604 is used to shift the center frequency of the transmitted signal. The rotator receives angle increments of rotation per sample from a direct digital synthesizer (DDS) 1606 driven by a transmit ramp generator 1608. The transmit ramp generator 1608 may be programmable to start from zero frequency offset to an offset equal to half the sampling frequency at base band. A main processor of the system can program the transmit pseudo-noise generator 1609 with the appropriate polynomial to use and also load the transmit ramp generator 1608 with the end frequency shift and the speed of the frequency shift (Hz/second). Then the main processor can issue a start command where the transmit pseudo-noise generator 1609 and the transmit ramp generator 1608 commence operations synchronously. Thus, each instantaneous shift frequency is tightly aligned to a PN phase of the PN code.

The transmit location signal processing also includes a receive pseudo-noise generator 1659, a receive ramp generator 1558, and a receive DSS 1656 to be used on the Rx signal chain side. The receive pseudo-noise generator 1659 is loaded with the same polynomial as the transmit pseudo-noise generator 1609, and the receive pseudo-noise generator 1659 is started at the same instant as the transmit pseudo-noise generator 1609. However, the receive pseudo-noise generator 1659 is loaded with a different initial condition that results in the generated Rx PN sequence lagging behind the Tx PN sequence by a determined number of samples. Similarly, the receive ramp generator 1558 is programmed with the same target frequency shift and the same rate of shift as the transmit ramp generator 1608 and is also started synchronously with the transmit ramp generator 1608. However, the receive ramp generator 1558 is programmed with different initial condition that causes the ramp on the Rx side to lag behind the Tx ramp. The receive ramp generator 1558 drives the receive DSS 1656 to generate receive rotation coefficients. Both the Rx PN sequence and the output of the receive digital signal processor 1557 are used in processing the Rx samples. The reason for the delay between the Rx PN and ramp samples relative to the Tx samples is to account for the round trip delay of the reflected radar signal. In one implementation, the generator is run at a rate of 10 million chips per second (10 MCPS). It is important to note that the mobile can change this rate at will, since the mobile both generates and detects the signal without external signal alterations and hence can use whatever is needed based on present condition as long as it is self-consistent from Tx to Rx.

Figure 17:
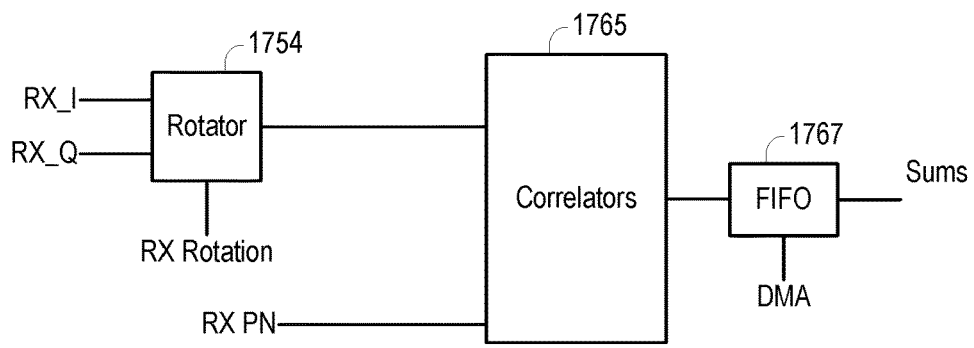
FIG. 17 is a functional block diagram of receive location signal processing according to a presently disclosed embodiment.

FIG. 17 is a functional block diagram of receive location signal processing according to a presently disclosed embodiment. The blocks of FIG. 17 may be used, for example, in the receive digital signal processor 1557 of FIG. 15. The receive location signal processing includes a sample rotator 1754, a bank of I and Q correlators 1765, and a FIFO 1767. Rx RF samples are first rotated by the sample rotator 1754 according values used to generate a corresponding transmitted signal. For example, when used with the transmit location signal processing of FIG. 16, the sample rotator 1754 may receive rotation values from the receive DSS 1656.

The rotated samples are then fed to the correlators 1765 to correlate with the Rx PN sequence. The correlators and their corresponding rotators can use the information generated in the transmit digital signal processor to look for multiple reflector echoes. When used with the transmit location signal processing of FIG. 16, the Rx PN sequence may be supplied by the receive pseudo-noise generator 1659. In an example implementation, there are 32 I and 32 Q correlators. Each of the correlator pairs correlates the incoming Rx samples with shifted copies of the Rx PN sequence. Each PN sequence cycle, the integration results of the correlators are dumped to the main processor through the FIFO 1767, for example, using a direct memory access (DMA) mechanism. A large value in a correlator sum indicates a reflector signal at the PN offset used by that correlator and corresponds to a range measurement. Also, the relative magnitude between I and Q path correlators using the same PN and rotator values yields the carrier phase of this echo by computing the arctangent of Q/I. To get finer time resolution, the sample rate of the Rx samples may be kept at a multiple of the PN chipping rate. In an embodiment, an Rx sample rate is used that is 8 times higher than the Tx PN chipping rate. For an example implementation using a 10 MCPS PN rate, the Rx RF signal is sampled and processed at 80 MSPS.

Periodically, the main processor gets the results of the correlators 1765. The processor searches for peaks (maxima) among these correlator sums. Pronounced values of $I^2+Q^2$ indicates the presence of an echo at the corresponding round trip time slot. The processor then computes the carrier phase of this pronounced echo and notes the frequency shift at which this carrier phase occurred. After processing a number of correlator dumps, the processor can build a table of carrier phase versus shift frequency at which the phases where observed for each identified echo.

For a given identified echo, the following processing can be performed. Assuming that the transmitted radar signal starts at center frequency $f_0$ and sweeps to $f_1$, from the carrier phase versus shift frequency table for an identified echo, the processing is able to measure the total phase shift the echo experienced while sweeping from $f_0$ to $f_1$. The table entries are used instead of just the first and last values in order to keep track of the total phase shift including counting full cycle shifts. Because each identified primary echo will have another secondary echo due to DDR, there is enough information to calculate the free air range between the mobile and the reflector to a fraction of a carrier cycle. Assuming that while sweeping from $f_0$ to $f_1$, the primary echo experiences a $cyc\_slip_{primary}$ carrier cycle slip, where $cyc\_slip_{primary}$ may not be an integer. Also, assuming that the secondary echo experiences a $cyc\_slip_{secondary}$ carrier cycle slip. From this, the total round trip carrier cycles at frequency $f_n$ from Tx to Rx is equal to number of cycles in the delay element, $cyc_{delay,n}$, plus number of cycles in free air round trip, $cyc_{air,n}$. For the secondary reflection, the round trip cycles value is equal to number of cycles in free air, $cyc_{air,n}$, plus two times the delay element cycles, $2 \times cyc_{delay,n}$. If L is the free air round trip to the reflector, $cyc_{air,n} = L/\lambda_n = L\ F_n/c$, where $\lambda_n$ is the carrier wavelength at center frequency $f_n$, and c is the speed of light in air. Also, $cyc_{delay,n} = element\_delay \times f_n$. Practically we do not know $cyc_{delay,n}$ or $cyc_{air,n}$ but we can measure $cyc\_slip_{primary}$ and $cyc\_slip_{secondary}$ accurately in the mobile during a given $f_0$ to $f_1$ sweep. Note that, $cyc\_slip_{Primary} = (cyc_{air,1} - cyc_{air,0}) + (cyc_{delay,1} - cyc_{delay,0})$, $cyc\_slip_{secondary} = (cyc_{air,1} - cyc_{air,0}) + 2 \times (cyc_{delay,1} - cyc_{delay,0})$, $cyc_{air} = L(f_1 - f_0)/c + cyc_{air,0}$, and $cyc_{delay,1} - cyc_{delay,0} = element\_delay \times (f_1 - f_0)$ From the above equations, a positioning process can calculate L and the delay of the delay element. The range to the reflector R=L/2 and the reflector element delay is used to identify the reflector from which the echo was produced.

The above method is useful since it eliminates any dependence of range measurements on delay element manufacturing and environmental variations and eliminates the need for constant reflector calibration. Also determining delay element delays of an echo to the accuracy at carrier phase level aids in identifying the corresponding reflector from which a reflected signal has been detected. For a system operating at 2.4 GHz, each carrier cycle spans 12 cm. Depending on available SNR, it becomes possible to obtain centimeter level range accuracy as well as identify distinct reflectors through their differing delay element delays at the nanosecond level. This allow for the distinction among hundreds of distinct reflectors within the same vicinity.

The above outlines how narrow frequency shifting can measure the ranges and delays of reflectors. Prior to performing this narrow frequency sweep, a broad frequency sweep may be done. This broad frequency sweep is designed to detect the optimal frequency for a frequency scanned type reflector. Once the maximum reflection frequency is detected, a narrow frequency sweep around that point is performed to measure the range and delay. This may only done in locations with sparse number of reflectors and hence the use of frequency swept reflectors yielding AOA becomes valuable. In environments where more than three reflectors are detectable, AOA can be ignored requiring no broad frequency sweep.

To support a multiuser environment and reduce confusing reflections, active power control can be implemented. Active power control continuously uses the received reflections measured power to adjust the output Tx power. This results in the minimum RF power being transmitted by one mobile to determine its position. In addition, using different or time shifted LFSR polynomials for each mobile insures that each mobile only detects reflections caused by its own generated radar signal.

Most description herein have assumed that the mobile is stationary (or nearly so) and hence the effects of Tx to Rx frequency shift due to Doppler can be ignored. This is true for majority of indoor situations since a position fix can take less than one millisecond. Even at an unrealistic 30 km/hr indoor speed, Doppler at 2.4 GHz is less than 25 degrees every millisecond. However, a positioning system can correct for the effect of Doppler by measuring it from cycle slipping rate while fixing the carrier frequency (not sweeping) for some period.

An overview of an installation process will now be provided. During installation, the reflector data (e.g., in the server 194 of FIG. 1) is uploaded. The reflector data may be uploaded, for example, through the internet by the installer, who has been given privileges to add to or alter the server data base. The reflector data may be uploaded using any of a number of Internet connected computing devices, for example, using a browser. After affixing position reflectors in a given area, the reflector data to be uploaded to the server can be obtained in various ways. The information may be obtained, for example, in a commercial setting, from accurate building blue prints and surveying equipment to determine the location and orientation of every reflector. Also, information specific to a given reflector could be downloaded from a manufacturer data sheet. All this information can be collected and uploaded to the server by the installer.

Alternately or additional, a mobile with positioning ability can be used to make position determinations while located at a number of previously surveyed points relative to a local coordinate system. If sufficient data points are taken, the server can determine the location of each reflector it receives an echo from along with their measured corresponding element delays. Only four non-planar points is geometrically sufficient for all detectable reflectors.

To relate the geometry of the mobile location and reflectors to the physical walls and objects in the room the following methodology can be used. A software package can create a 3D model of a room including objects within the room from number of photographs of the room. If the measuring points for locating the reflectors are identified within some of the photographs, then the 3D map of the room has a fixed relationship to the coordinate system of the reflectors and hence the movement of the mobile can be plotted in 3D within the 3D model of the room. This can provide a great aid for application developers to use the data generated according to the position systems and method disclosed herein.

A combination installation process operates as follows. After installing the reflectors, a mobile with positioning and equipped with a digital camera is made to take a number of photographs of the internals of the room. Each time a photo is snapped, the mobile measures ranges and reflector delays for all the reflectors it detects. After a few points, the mobile can locate the reflectors locations relative to each other and the mobile. This information is used while the 3D model of the room is determined by the taken photographs from which a 3D model of the room is built while at the same time overlaying on top of the model the coordinate system of the installed reflectors.

Alternatively or additionally, the reflector data may be obtained, for example, in residential homes, by imaging. Mobile application software may be used to produce a 3D room map by holding the mobile upright and scanning with the camera in the mobile all the walls of the room. In order to locate the reflectors, each of the reflectors may have an area that has been covered with retro-reflective optical tape. This tape shows up very brightly in the camera if illuminated by the camera flash. So during the scanning of the room with the camera, the flash of the mobile is kept on. Whenever a reflector comes into frame, the optical retro-reflective tape shows up very brightly in the camera and is identified as a reflector and its location within the room noted. This tape can be made with various colors or color stripes so that the mobile could identify which of surrounding reflector it is. A bar code on the reflector would be scanned a priori so that the mobile is able to get all of the reflector RF characteristics and optical tape color from a simple bar code scan. After collecting this information about the room geometry, the location and orientation of each reflector and the reflector characteristics, the mobile application uploads this information to the server to be available to other mobiles that need to determine their location within that room.

Upload privileges may be given based on location of origination. For example, if a mobile is attempting to upload reflector information to the server about a given room, the server would only accept this information if it came from a router that is physically present near the room. A password may also provisioned for added security. As mentioned above, any mobile that succeeds in determining its location, can anonymously upload to the server the location it has determined, from what reflector assumptions, and with what degree of confidence. The server uses this information that is constantly being uploaded by location determining mobiles to continually improve and refine the accuracy of its resident data base. The mobile proceeds to determine its location by detecting and processing the radar signal reflections from close by reflectors. It uses the information available from the server that was uploaded to the server as mentioned previously in the calculation. It then compares the determined position to its actual surveyed position and uploads corrections to the server information in order to improve accuracy of subsequent position determinations by other mobiles.

Indoor positioning described herein relies on the detection of radar reflected signals to determine physical location. Detecting radar reflections can be done by using a matched filter in the case of a CW or LFM type radar signal. In case that the transmitted radar signal is DSSS encoded, a RAKE receiver can be used to detect the weak reflections. In both cases, the phase of the reflection is determined through various techniques that track the received signal carrier frequency phase after either pulse compression, in the case of CW or LFM, or PRN de-spreading is performed. The integer carrier ambiguity is resolved according to the techniques described above, such as short duration pulsing, or increasing the bandwidth through LFM or DSSS methods with coherent demodulation. The coherent processing is made easy due to the common transmit and receive frequency reference used.

Although this disclosure focuses on a mobile determining its location within an indoor environment, the same or similar techniques can be used to determine a mobile's location within an outdoor environment. This type of outdoor positioning may be used, for example, in "urban canyons" where narrow streets and tall building reduce the availability and accuracy of GPS based location determination due to GPS signal blocking and multipath. Additionally, the disclosed positioning systems and method may be adapted to locate drones including determine relative positions of multiple drones. Various drones may include position reflectors, positioning as described for a mobile device, or both. Such a system may be used for collision avoidance.

The disclosed positioning can be performed by a mobile device using circuitry already found in mobile devices. The circuitry can be shared between performing their original function and the new position locations functions. A number of radar signal modulations that can be used with the reflectors and how to resolve the carrier integer ambiguity to yield very accurate range measurement have been disclosed. The mobile architecture in an embodiment can generate and process all of the waveforms described herein and is flexible enough to alter the radar wave modulation and characteristics on the fly as needed. Finally, how a system can be installed and how the server information can be refined in both commercial as well as residential settings is disclosed.

Figure 18:
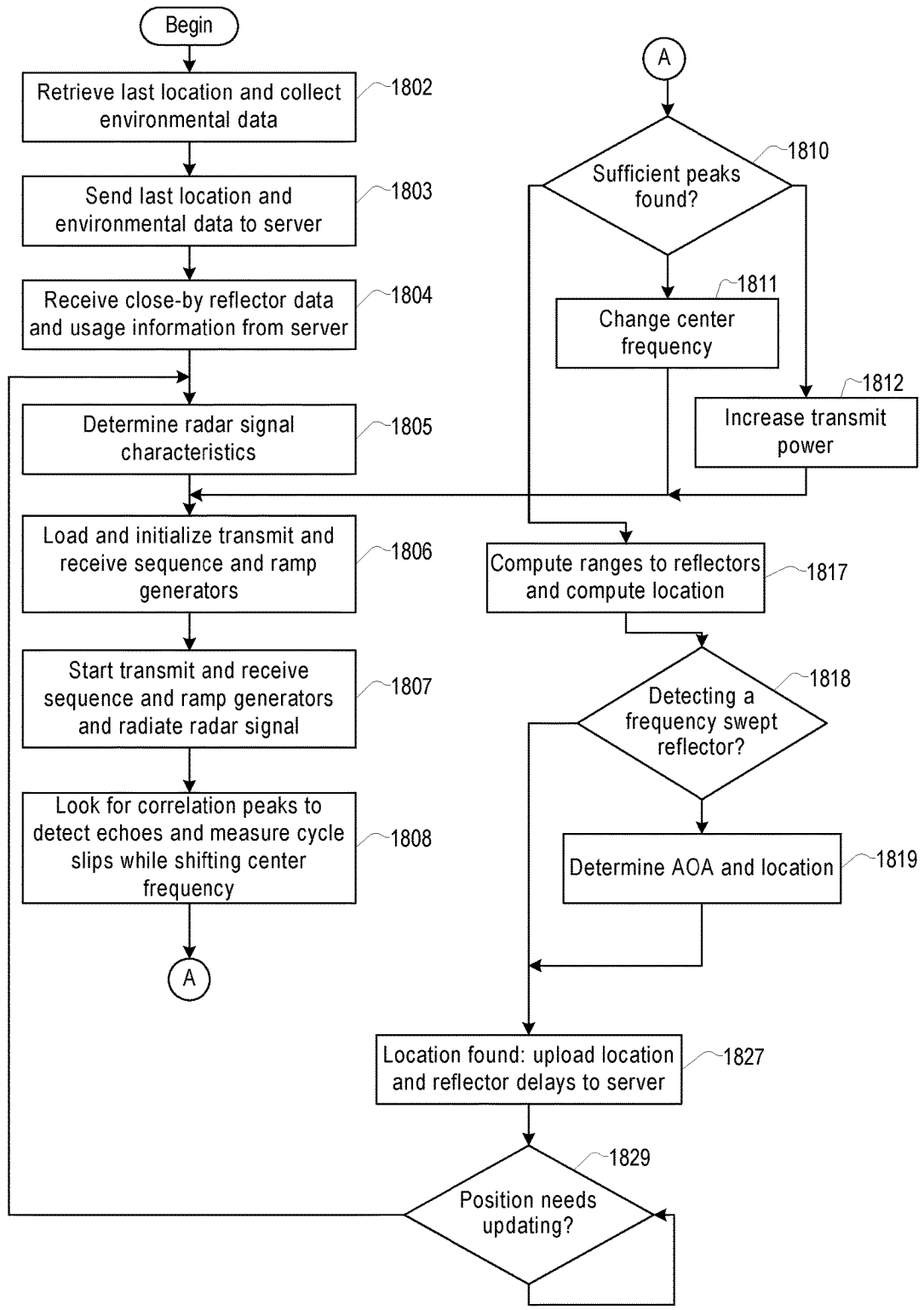
FIG. 18 is a flowchart a process for determining position location according to a presently disclosed embodiment.

FIG. 18 is a flowchart a process for determining position location according to a presently disclosed embodiment. To provide a specific example, the process will be described as executed by the mobile device 185 in the system of FIG. 1. However, the process may be performed using any suitable apparatus. Additionally, further details of many steps are described above.

When the mobile wishes to determine its position, in step 1802, it retrieves its last location and collects environmental data about its surroundings. In step 1803, the last location and environmental data are sent to the server 194. In step 1804, the mobile receives, from the server, reflector data for position reflectors in its vicinity. The mobile may also receive information on how it should be perform the positioning, for example, the allowed bandwidth, RF power, and time slots for the transmitted radar signal.

In step 1805, the mobile determines the radar signal characteristics it will use to begin its position determination. For example, the mobile can determine the radar signal modulation scheme, bandwidth, output power, chipping rate, and timings. These characteristics may be determined based on a desired position accuracy.

In step 1806, the mobile can load and initialize transmit and receive LFSR and ramp generators, for example, as described with reference to FIG. 16. In step 1807, the mobile start the transmit and receive LFSR and ramp generators and radiates the generated radar signal. In step 1808, the mobile processes signals received in response to the transmission of step 1807. For example, the process may look for correlation peaks to detect echoes and also measure cycle slips while shifting center frequency. The mobile then determines, in step 1810, if sufficient peaks are found in the correlation data. This determination may be based on a desired position accuracy and on what previous processing has been performed. If sufficient peaks are found, the process continues to step 1817. If sufficient peaks are not found, the process continues to step 1811 where it changes the center frequency of the radar signal and then returns to step 1806. If sufficient peaks are not found and process has iterated steps 1806-1810 over a range of center frequencies, the process continues to step 1812. In step 1812, the process increases the transmit power and then returns to step 1806.

In step 1817, the process computes ranges to reflectors using the correlation peaks. The process can then compute its location. In step 1818, the process determines if it is detecting a frequency swept reflector. In this case, the process continues to step 1819 where it can determine AOA and further determine its location. Otherwise, the process continues to step 1827.

In step 1827, the mobile has determined its location. The mobile can send the determined location and also detected reflector delays to the server, which can then update its database of reflector data. The process then continues to step 1829 where it remains until a position update is desired. In this event, the process returns to step 1805.

The process of FIG. 18 may be modified by adding, omitting, reordering, or altering steps. Additionally, steps may be performed concurrently and a step that occurs after another step need not be immediately after.

The foregoing systems and methods and associated devices and modules are susceptible to many variations. Additionally, for clarity and concision, many descriptions of the systems and methods have been simplified. For example, the figures generally illustrate one or few of each type of device, but a communication system may have many of each type of device. Additionally, features of the various embodiments may be combined in combinations that differ from those described above.

As described in this specification, various systems and methods are described as working to optimize particular parameters, functions, or operations. This use of the term optimize does not necessarily mean optimize in an abstract theoretical or global sense. Rather, the systems and methods may work to improve performance using algorithms that are expected to improve performance in at least many common cases. For example, the systems and methods may work to optimize performance judged by particular functions or criteria. Similar terms like minimize or maximize are used in a like manner.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Furthermore, in addition to executing instructions, a processor may include specific purpose hardware to accomplish some functions.

The steps of any method or algorithm and the processes of any block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described as transmitting data to (or receiving from) a second device when there are intermediary devices that couple the first and second device and also when the first device is unaware of the ultimate destination of the data.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent particular aspects and embodiments of the invention and are therefore representative examples of the subject matter that is broadly contemplated by the present invention. It is further understood that the scope of the present invention fully encompasses other embodiments that are, or may become, obvious to those skilled in the art and that the scope of the present invention is accordingly not limited by the descriptions presented herein.

What is claimed is:

1. A positioning system, comprising:
   a plurality of position reflectors, each of the position reflectors configured to reflect coded signals transmitted by the mobile device as reflected signals, each reflected radar signal including a primary reflection delayed by an internal delay of the position reflector; and
   one or more servers having reflector data associated with the plurality of position reflectors and configured to,
      receive coarse position information of a mobile device, the coarse position information indicating an approximate location of the mobile device, and
      transmit at least a portion of the reflector data to the mobile device based on the coarse position information.

2. The positioning system of claim 1, wherein each reflected signal further includes a second reflection delayed from the primary reflection by an integer multiple of the internal delay of the position reflector.

3. The positioning system of claim 2, wherein the reflector data stored by the one or more servers includes:
- locations of the plurality of position reflectors;
- orientations of the plurality of position reflectors;
- internal delays of the plurality of position reflectors;
- delays from primary to secondary reflections of the plurality of position reflectors;
- power levels of the primary and secondary reflections of the plurality of position reflectors; and
- frequency characteristics of the plurality of position reflectors.

4. The positioning system of claim 1, wherein the one or more servers are configured to control radiation power, bandwidth, duration, and center frequency of the coded signal transmitted by the mobile device.

5. The positioning system of claim 1, wherein at least one of the plurality of position reflectors comprises:
- an antenna;
- a delay element; and
- a matching network coupling the antenna to the delay element, the matching network transforming an impedance of the antenna to an impedance of the delay element.

6. The positioning system of claim 5, wherein the matching network mismatches the impedance of the antenna to the impedance of the delay element thereby causing a secondary reflection from the position reflector.

7. The positioning system of claim 1, wherein at least one of the plurality of position reflectors comprises:
- an antenna;
- a delay element;
- a circulator having a first terminal for coupling to the antenna, a second terminal coupled to a first terminal of the delay element, and a third terminal coupled to a second terminal of the delay element; and
- a matching network coupling the antenna to the circulator, the matching network transforming an impedance of the antenna to an impedance of the delay element.

8. The positioning system of claim 1, wherein at least one of the plurality of position reflectors comprises:
- an array of antennas;
- a plurality of transmission paths sequentially coupling the array of the antennas;
- a delay element; and
- a matching network coupling a first one of the plurality of transmission paths to the delay element, the matching network transforming an impedance of the array of antennas to an impedance of the delay element.

9. A method for mobile device indoor position determination, the method comprising:
- storing reflector data associated with a plurality of position reflectors at a server;
- receiving coarse position information of a mobile device at the server;
- transmitting, from the server, at least a portion of the reflector data to the mobile device based on the coarse position information;
- receiving, at a position reflector of the plurality of position reflectors, a coded signal from a mobile device; and
- reflecting the coded signal transmitted by the mobile device as reflected signals, each reflected signal including a primary reflection delayed by an internal delay of the position reflector.

10. The method of claim 9, wherein the coded signal is modulated with direct sequence spread spectrum (DSSS) modulation.

11. The method of claim 9, wherein reflecting the reflected signal to the mobile device further includes a second reflection delayed from the primary reflection by an integer multiple of the internal delay of the position reflector.

12. The method of claim 9, wherein the reflector data stored by the server includes:
- locations of the plurality of position reflectors;
- orientations of the plurality of position reflectors;
- internal delays of the plurality of position reflectors;
- delays from primary to secondary reflections of the plurality of position reflectors;
- power levels of the primary and secondary reflections of the plurality of position reflectors; and
- frequency characteristics of the plurality of position reflectors.

13. The method of claim 9 further comprising, controlling, by the server, radiation power, bandwidth, duration, and center frequency of the coded signal transmitted by the mobile device.

14. The method of claim 9, wherein at least one of the plurality of position reflectors comprises:
- an antenna;
- a delay element; and
- a matching network coupling the antenna to the delay element, the matching network transforming an impedance of the antenna to an impedance of the delay element.

15. The method of claim 14, wherein the matching network mismatches the impedance of the antenna to the impedance of the delay element thereby causing a secondary reflection from the position reflector.

16. The method of claim 9, wherein at least one of the plurality of position reflectors comprises:
- an antenna;
- a delay element;
- a circulator having a first terminal for coupling to the antenna, a second terminal coupled to a first terminal of the delay element, and a third terminal coupled to a second terminal of the delay element; and
- a matching network coupling the antenna to the circulator, the matching network transforming an impedance of the antenna to an impedance of the delay element.

17. The method of claim 9, wherein at least one of the plurality of position reflectors comprises:
- an array of antennas;
- a plurality of transmission paths sequentially coupling the array of the antennas;
- a delay element; and
- a matching network coupling a first one of the plurality of transmission paths to the delay element, the matching network transforming an impedance of the array of antennas to an impedance of the delay element.

* * * * *